United States Patent

(12) United States Patent
Iwasawa et al.

(10) Patent No.: US 12,372,906 B2
(45) Date of Patent: Jul. 29, 2025

US012372906B2

(54) FIXING MEMBER AND FIXING UNIT

(71) Applicant: CANON KABUSHIKI KAISHA, Tokyo (JP)

(72) Inventors: Yusaku Iwasawa, Shizuoka (JP); Takaaki Tsuruya, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 86 days.

(21) Appl. No.: 18/190,498

(22) Filed: Mar. 27, 2023

(65) Prior Publication Data

US 2023/0324839 A1 Oct. 12, 2023

(30) Foreign Application Priority Data

Apr. 6, 2022 (JP) ................................ 2022-063233

(51) Int. Cl.
*G03G 15/20* (2006.01)

(52) U.S. Cl.
CPC ..... *G03G 15/2057* (2013.01); *G03G 15/2064* (2013.01); *G03G 2215/2051* (2013.01)

(58) Field of Classification Search
CPC ....................... G03G 15/2053; G03G 15/2057
See application file for complete search history.

(56) References Cited

U.S. PATENT DOCUMENTS 4,628,183 A * 12/1986 Satomura ........... G03G 15/2053 219/505
4,743,940 A * 5/1988 Nagasaka .......... G03G 15/2053 428/35.8
5,420,395 A * 5/1995 Hyllberg ............ G03G 15/2042 492/46
5,752,148 A * 5/1998 Yoneda .............. G03G 15/2064 399/329
8,457,514 B2 * 6/2013 Mizumo ............ G03G 15/2053 399/328

(Continued)

FOREIGN PATENT DOCUMENTS

JP 2005203272 A * 7/2005
JP 2015118232 A 6/2015

(Continued)

OTHER PUBLICATIONS

Machine translation of Baba (2005).*

*Primary Examiner* — Sevan A Aydin
(74) *Attorney, Agent, or Firm* — Canon U.S.A., Inc. IP Division

(57) ABSTRACT

A fixing member includes a conductive layer that generates heat when a circulation current in a circumferential direction of the fixing member having a tubular shape is induced. The conductive layer includes segments arranged in a row in a longitudinal direction of the tubular shape and electrically separated from each other. Each segment is formed continuously over an entire circumference of the tubular shape in the circumferential direction. The conductive layer is configured such that a heat generation amount in an end portion of the fixing member in the longitudinal direction is less than a heat generation amount in a central portion of the fixing member in the longitudinal direction when an alternating magnetic field is applied to a whole area of the fixing member in the longitudinal direction in a state where a temperature of the central portion is equal to a temperature of the end portion.

12 Claims, 12 Drawing Sheets

(56) References Cited

U.S. PATENT DOCUMENTS

| | | | | |
|---|---|---|---|---|
| 2015/0168893 A1* | 6/2015 | Yonekubo | G03G 15/2053 | 399/329 |
| 2016/0109835 A1* | 4/2016 | Kurata | G03G 15/2042 | 399/67 |

FOREIGN PATENT DOCUMENTS

| | | | |
|---|---|---|---|
| JP | 2020038292 | A | 3/2020 |
| JP | 2021117363 | A | 8/2021 |

* cited by examiner

FIXING MEMBER AND FIXING UNIT

BACKGROUND

Field

This disclosure relates to a fixing member used for an induction heating type fixing unit and a fixing unit including the fixing member.

Description of the Related Art

In electrophotographic image forming apparatuses, fixing units which heat fixing members by the principle of induction heating and fix an image on a recording material by the heated fixing members are brown. This type of the fixing members includes a circumferentially continuous conductive layer, and generates heat by Joule heat which is generated when an induction current circulates around the conductive layer in response to an alternating magnetic field formed by a magnetic field generation member such as a coil.

In Japanese Patent Application Laid Open No. 2015-118232, it is described that; by dividing a heating layer (conductive layer) of a tubular fixing member into a plurality of areas (segments) in a longitudinal direction, even if damage such as cracks have occurred in the heating layer, an abnormal temperature rise is made less likely to occur in adjacent arms of the damaged portion.

In a case such as continuous image formation on a plurality of sheets of the recording material, a phenomenon (called as a temperature rise in a non-sheet passing portion) may occur. When the temperature rise in the non-sheet passing portion occurs, a temperature of an end portion area (i.e., non-sheet passing portion) where the fixing member does not came into contact with the recording material becomes higher in comparison with an area where the fixing member comes into contact with the recording material. In a case where an extent of the temperature rise in the non-sheet passing portion is remarkable, there is a possibility that, since deterioration such as wear or changes in physical properties of surfaces of the fixing member and members adjacent to the fixing member will be caused by the heat; performance or durability of the fixing unit will decrease. Further, since the occurrence of the temperature rise in the non-sheet passing portion means energy consumption in a form of not contributing to the fixation of the image, the temperature rise in the non-sheet passing portion is preferably kept to be as little as possible.

SUMMARY

The present disclosure provides a fixing member and a fixing unit in which a conductive layer of the fixing member includes a plurality of segments and which can reduce temperature rise in a non-sheet passing portion.

According to an aspect of the present disclosure, a fixing member includes a conductive layer configured to generate heat in a case where a circulation current in a circumferential direction of the fixing member having a tubular shape is induced, wherein the conductive layer includes a plurality of segments arranged in a row in a longitudinal direction of the tubular shape and electrically separated from each other, where each of the plurality of segments is formed continuously over an entire circumference of the tubular shape in the circumferential direction, and wherein the conductive layer is configured such that a heat generation amount in an end portion of the fixing member in the longitudinal direction is less than a heat generation amount in a central portion of the fixing member in the longitudinal direction in a case where an alternating magnetic field is applied to a whole area of the fixing member in the longitudinal direction in a state where a temperature of the central portion of the fixing member is equal to a temperature of the end portion of the fixing member.

Further features of the present disclosure will become apparent from the following description of exemplary embodiments with reference to the attached drawings.

DESCRIPTION OF THE EMBODIMENTS

Hereinafter, embodiments of this disclosure will be described with reference to drawings.

Example 1

(1) Image Forming Apparatus

Figure 2:
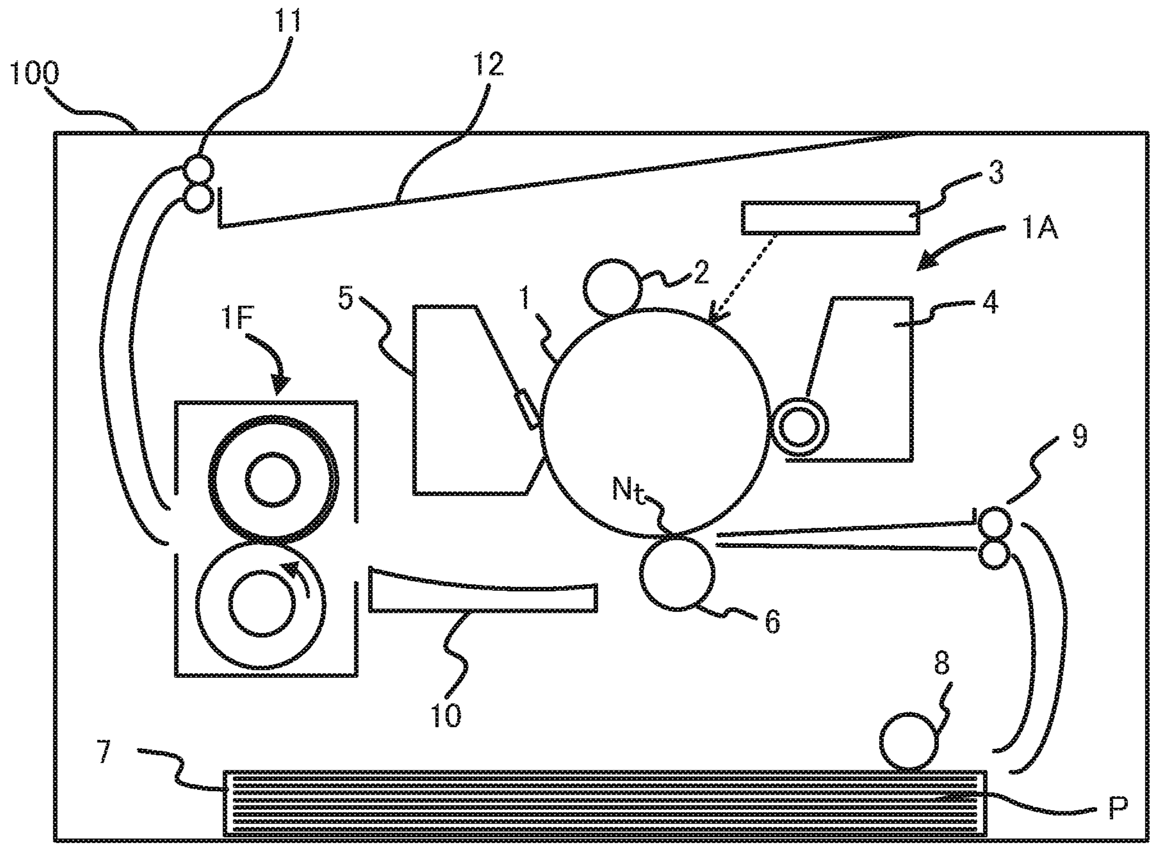
FIG. 2 is a schematic diagram illustrating an image forming apparatus of the example 1.

With reference to FIG. 2, an image forming apparatus 100 of an embodiment (example 1) will be described. The image forming apparatus 100 is an image forming apparatus of an electrophotographic system, and, in particular, a monochrome printer of a direct transfer system. The image forming apparatus 100 forms an image on a recording material P using toner (developer) based on image data received from an external apparatus. Not limited to a single-function printer having only a printing function, the image forming apparatus may be a copy machine, a facsimile, or a multi-functional machine combining a plurality of these functions. As the recording material P, it is possible to use various sheet materials which are different in size and materials, including paper such as standard paper and cardboard, a plastic film, cloth, a surface treated sheet such as coated paper, a sheet material of a special shape such as an envelope and index paper, and the like.

The image forming apparatus 100 includes an image forming unit 1A for forming a toner image (hereinafter simply referred to as an image) on the recording material P and a fixing unit 1F for fixing the image on the recording material P The image forming unit 1A includes a photosensitive drum 1, serving as an image bearing member, a charge unit 2, a laser scanner 3, serving as an exposing unit, a developing unit 4, a cleaner 5, and a transfer member 6. The photosensitive drum 1 is a photoconductor (electrophotographic photoconductor) formed in a drum shape. A configuration of the fixing unit 1F will be described below.

An image forming operation of the image forming apparatus 100 will be described. When a control unit of the image forming apparatus has received the image data, the image forming operation is started. When the image forming operation has been started, the photosensitive drum 1 is rotatably driven, and a surface of the photosensitive drum 1 is uniformly charged by the charge unit 2. The laser scanner 3 irradiates the photosensitive drum 1 with a laser beam in accordance with a video signal generated based on the image data, and performs an exposure step of writing an electrostatic latent image on the surface of the photosensitive drum 1. The developing unit 4 performs a development step using the toner as the developer, and visualizes the electrostatic latent image as the image (toner image).

Concurrently with the operation described above, the recording material P stored in a cassette Tin an interior of an image forming apparatus body is fed one sheet at a time by the rotation of a feed roller 8. The recording material P is conveyed to a transfer nip Nt (transfer portion) formed between the photosensitive drum 1 and the transfer member 6 by a registration roller 9. The image which has been formed on the photosensitive drum 1 and conveyed to the transfer Trip Nt by the rotation of the photosensitive drum 1 is transferred onto the recording material P at the transfer nip Nt.

The recording material P which has passed through the transfer nip Nt is sent to the fixing unit 1F via a conveyance guide 10. By heating the image on the recording material P, the fixing unit 1F fixes the image on the recording material P The recording material P which has passed through the fixing unit 1F is discharged to an exterior of the apparatus body by a sheet discharge roller 11, and stacked on a tray 12.

The image forming apparatus 100 described above is an example of image forming apparatuses. It is acceptable that the image forming unit 1A is an image forming apparatus of an intermediate transfer system in which the image formed on the image bearing member is transferred onto the recording material via an intermediate transfer member such as an intermediate transfer belt. Further, it is acceptable that the image forming unit 1A is configured to be capable of forming monochromatic images of respective colors on a plurality of photosensitive drums using a plurality of colors of toner, and configured to be capable of forming a color image by superimposing the monochromatic images of the respective colors on the intermediate transfer member or the recording material.

(2) Fixing Unit (2-1) Overview of Configuration

Figure 3:
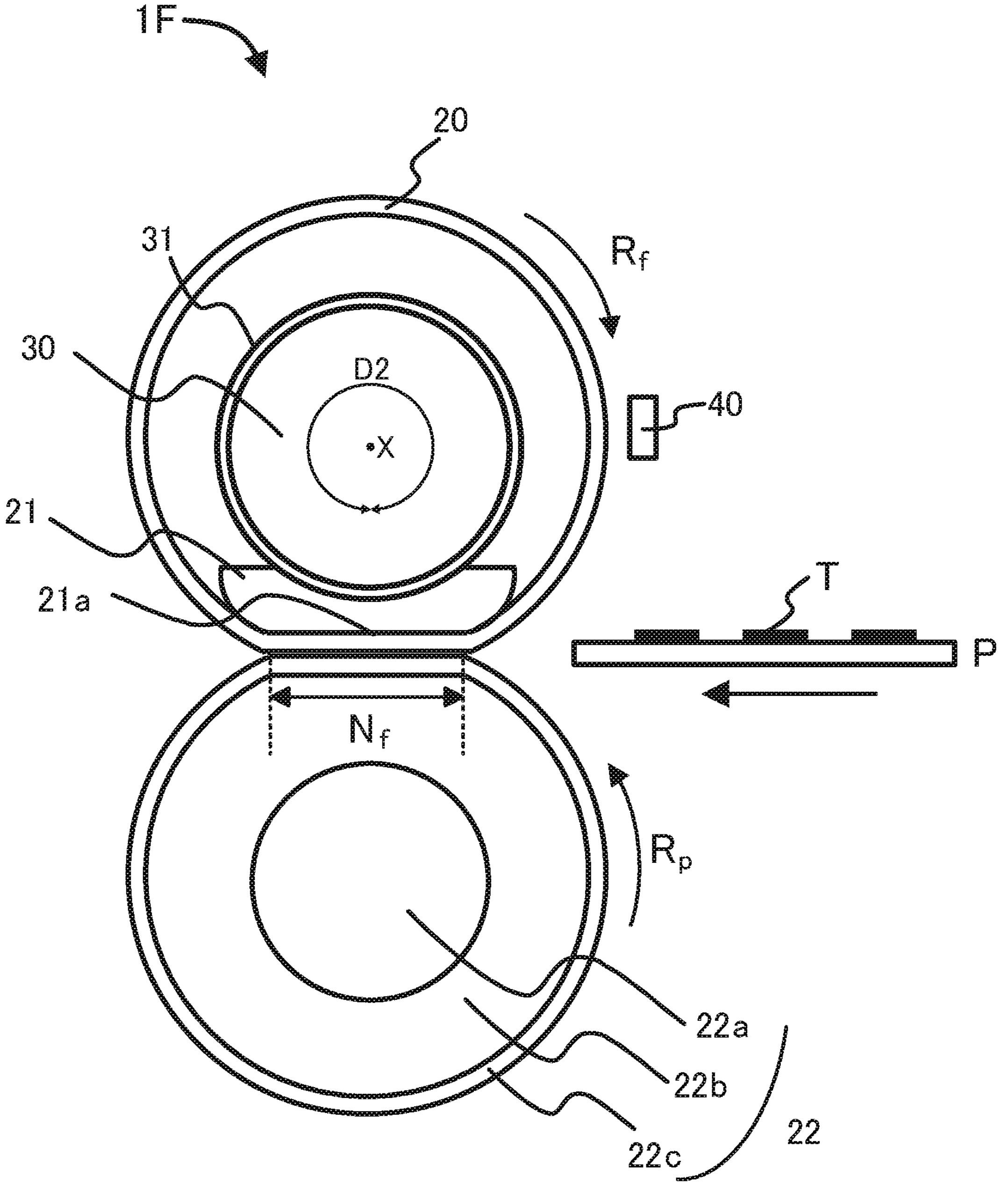
FIG. 3 is a schematic diagram illustrating a fixing unit of the example 1.

Next, an overview of the fixing unit 1F of the present embodiment will be described. FIG. 3 is a schematic diagram illustrating a cross section of the fixing unit 1F.

Hereinafter, rotational axis directions of a fixing film 20 and a press roller 22 are referred to as a longitudinal direction D1 of the fixing unit 1F or simply the longitudinal direction D1. The longitudinal direction D1 is a longitudinal direction (direction of the generatrix) of the fixing film 20 having a tubular shape. Further, the longitudinal direction D1 of the fixing unit 1F is a direction (width direction of the recording material) perpendicularly intersecting with a conveyance direction of the recording material at a fixing nip Nf. Further, the longitudinal direction D1 of the fixing unit 1F is substantially the same direction as a main scanning direction at a time of image formation in the image forming unit 1A.

Further, a circumferential direction D2 of the fixing film 20 is a direction circulating along a surface of the fixing film 20 in a direction perpendicularly intersecting with the longitudinal direction 1. In a case where the fixing film 20 is assumed to be in a cylindrical shape, the circumferential direction D2 can be a direction along a virtual circle having its center at a virtual rotational axis X of the fixing film 20. The rotational axis X is a straight line extending in the longitudinal direction D1 along a geometric center of the fixing film 20 when viewed in the longitudinal direction D1.

As illustrated in FIG. 3, the fixing unit 1F includes the fixing film 20, serving as a tubular heating rotary member, a nip formation member 21, and a press roller 22, serving as a facing member (pressing member). Further, the fixing unit 1F includes a magnetic core 30, serving as a magnetic body, and an exciting coil 31, serving as a magnetic field generating member. All of the fixing film 20, the magnetic core 30, the press roller 22, and the nip formation member 21 are members elongated in the longitudinal direction D1, and a dimension of each member in the longitudinal direction D1 (longitudinal width) is longer than a maximum width of the recording material P on which the fixing unit 1F can fix the image. Hereinafter, a passing area, in which the maximum width recording material P passes at a time of passing through the fixing unit 1F, in the longitudinal direction D1 is referred to as a sheet passing portion or a sheet passing area, and an outside area of the sheet passing portion in the longitudinal direction D1 is referred to as a non-sheet passing portion or a non-sheet passing area.

The nip formation member 21 is made of a heat resistant material such as a heat resistant resin, and is inserted into an inner space of the fixing film 20. The nip formation member 21 faces the press roller 22 across the fixing film 20 in a vertical direction perpendicularly intersecting with both of the longitudinal direction D1 and the conveyance direction of the recording material P Part of a surface of the nip formation member 21 of this example, on a side of the press roller 22, is formed as a flat surface portion 21*a* extending in the longitudinal direction D1 and the conveyance direction of the recording material P The fixing nip Nf is formed between the flat surface portion 21*a* of the nip formation member 21 and the press roller 22.

The press roller 22 includes a core metal 22*a*, an elastic layer 22*b* formed on an outer circumferential surface of the core metal 22*a*, and a release layer 22*c* formed on an outer circumferential surface of the elastic layer 22*b*. An outside diameter of the press roller 22 in this example is 30 millimeters (mm).

A support configuration of the fixing unit 1F will be described. Both end portions of the nip formation member 21 in the longitudinal direction D1 are supported by a frame of the fixing unit 1F via flange members 60, described below. The frame of the fixing unit 1F is fixed to a frame of the image forming apparatus 100. A shaft portion of the core metal 22*a* of the press roller 22 is supported, via bearings, in a manner rotatable with respect to the frame of the fixing unit 1F and movable with respect to the nip formation member 21 in the abovementioned vertical direction. The press roller 22 comes into pressure contact with the nip formation member 21 by an urging force of an urging member such as a spring. In this example, the bearings at both sides of the press roller 22 in the longitudinal direction D1 are pressed by a pressing force of approximately 196 newtons (N) to 392N (approximately 20 kilogram farce (Kgf) to 40 (Kgf) in terms of a total pressure (sum). Thereby, the elastic layer 22*b* of the press roller 22 is elastically deformed, so that the fixing nip Nf in which surfaces of the fixing film 20 and the press roller 22 come into contact with each other with a predetermined width in the conveyance direction of the recording material is formed.

(2-2) Fixing Film

Next, the fixing film 20 of this example will be described. It is possible to form the fixing film 20 in the tubular shape with a diameter of 10 mm to 100 mm. An outside diameter of the fixing film 20 of this example is 30 mm. The fixing film 20 is made of a material having flexibility and heat resistance.

Figure 1A:
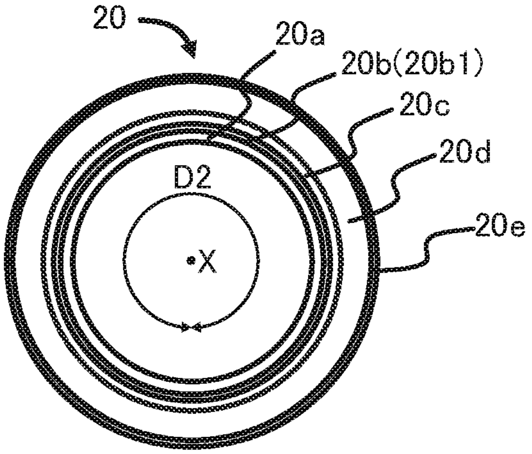
FIGS. 1A and 1B are transverse sections of a fixing film of an example 1.
Figure 1B:
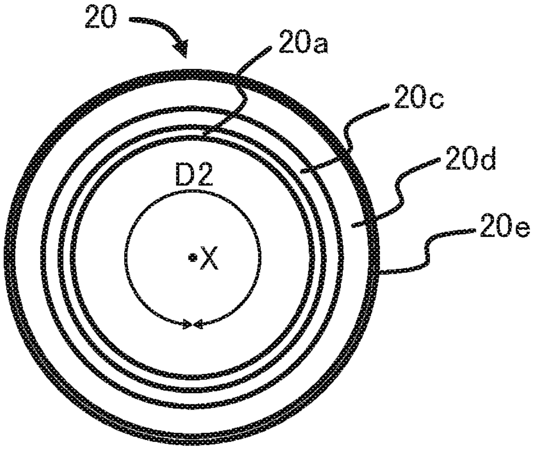
Figure 1C:
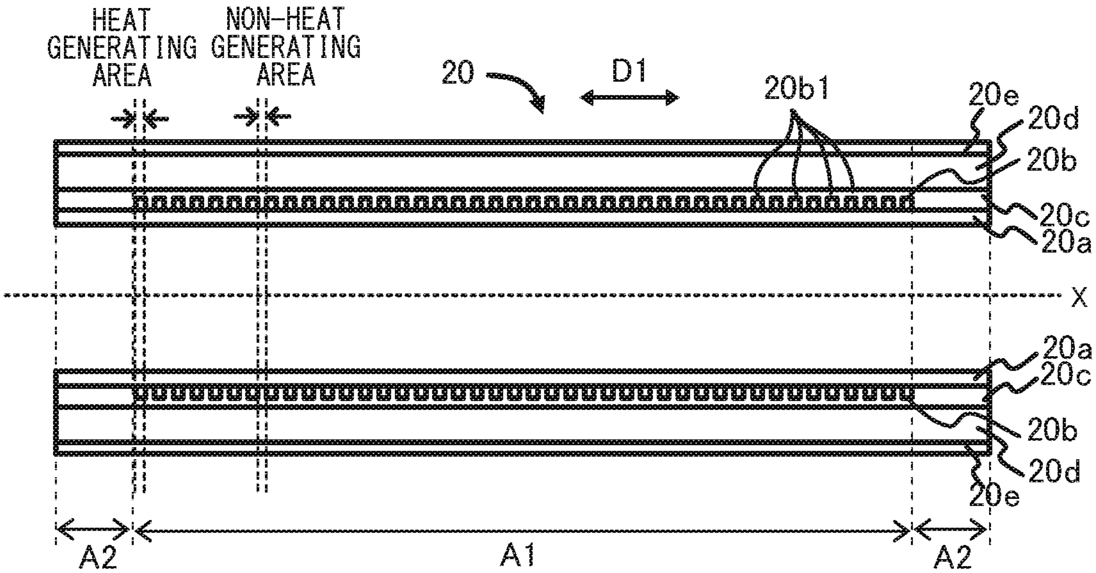
FIG. 1C is a longitudinal section of the fixing film of the example 1.

Cross-sectional views of the fixing film 20 are illustrated in FIGS. 1A to 1C. FIGS. 1A and 1B are transverse sections of the fixing film 20. FIG. 1C is a longitudinal section of the fixing film 20. A layer configuration of the fixing film 20 and a pattern of conductive layer are illustrated in the cross-sectional views in FIGS. 1A to 1C. To be noted, for the fixing film 20 and its components, a cross section cut by an imaginary plane perpendicular to the longitudinal direction D1 is referred to as the transverse section, and a cross section cut by an imaginary plane parallel to the longitudinal direction D1 is referred to as the longitudinal section.

As illustrated in FIG. 1A, the fixing film 20 has a structure in which a base layer 20*a*, the conductive layer 20*b*, a protective layer 20*c*, an elastic layer 20*d*, and a release layer 20*e* are sequentially formed from an inner circumferential side to an outer circumferential side. An inner surface of the base layer 20*a* is an inner circumferential surface of the fixing film 20, and an outer surface of the release layer 20*e* is an outer circumferential surface of the fixing film 20.

As illustrated in FIG. 1C, the conductive layer 20*b* includes a plurality of segments 20*b*1 (divided conductors, conductive elements) arranged in a row in the longitudinal direction D1. Each segment 20*b*1 continues over the entire circumference of the fixing film 20 in the circumferential direction D2. That is, the conductive layer 20*b* includes circular shape (ring shape) elements.

The segments 20*b*1 included in the conductive layer 20*b* are electrically separated from each other with respect to the longitudinal direction D1. In other words, the conductive layer 20*b* is configured such that conductive materials included in the conductive layer 20*b* are electrically separated from each other in the longitudinal direction D1. In this example, the plurality of segments 20*b*1 are electrically insulated from each other by disposing the segments 20*b*1 adjacent to each other at predetermined intervals. That is, the conductive layer 20*b* intermittently exists in the longitudinal direction D1. To be noted, it is acceptable to dispose the plurality of segments 20*b*1 closely adjacent to each other.

In this example, an occupying ratio of the conductive layer 20*b* is different depending on a position in the longitudinal direction D1. In particular, presence or absence of the segments 20*b*1 of the conductive layer 20*b* is different between a central area A1 (first area) of the fixing film 20 positioned in a central portion in the longitudinal direction D1 and end areas A2 (second area) positioned on both outside of the central area A1 and on end portions of the fixing film 20. An arrangement pattern of the segments 20*b*1 and its action will be described below.

FIG. 1A is the transverse section of the fixing film 20 illustrating an area in the longitudinal direction D1 (hereinafter referred to as a heat generating area) in which any one of the segments 20*b*1 of the conductive layer 20*b* exists. FIG. 1B is the transverse section of the fixing film 20 illustrating an area in the longitudinal direction D1 (hereinafter referred to as anon-heat generating area) in which the segments 20*b*1 of the conductive layer 20*b* do not exist.

A substance which is non-magnetic and has a high volumetric resistivity and excellent heat resistance is suitable for a material of the base layer 20*a*. Such a substance includes, for example, the heat resistant resin such as polyimide (PI) and polyamideimide (PAI), a fiber reinforced resin such as carbon fiber reinforced plastics (CFRP) and a glass fiber reinforced resin (GFRP), and the like. In a case of using the heat resistant resin, the thickness of the base layer 20*a* is preferably a thickness with which the strength of the fixing film 20, sliding properties of the fixing nip Nf, and the rotational stability of the fixing film 20 are easily obtained, and, for example, thicknesses of 20 to 200 micrometers (μm) are suitable. In this example, the base layer is formed of the PI, and the thickness is set at 50 μm.

For a material of the conductive layer 20*b*, for example, metal having a low volume resistivity, such as gold, silver, copper, iron, platinum, tin, stainless steel, titanium, aluminum, and nickel, are suitable. In this example, copper is used as the material of the conductive layer 20*b*, and the thickness is set at 3 μm. Further, in this example, the width and thickness of each conductive layer 20*b* in the longitudinal direction D1 are set to be constant.

An example of a method for forming the conductive layer 20*b* will be described. A coating film is formed by preparing paint containing a microparticle of the abovementioned metal and a polyimide precursor solution and, then, coating an outer surface of the base layer 20*a*, which has been prepared in advance, with the abovementioned paint in a manner of blade coating screen printing or the like. In the coating process, by a common technique (such as a masking process), dividing portions (uncoated portions) dividing the segments 20*b*1 into each other are formed in portions corresponding to the non-heat generating area so as to form the segments 20*b*1 at the predetermined intervals in the longitudinal direction D1. Thereafter, the coating film described above is gradually heated and dried to and at about 300° C. to 500° C. so as to progress an imidation, so that the segments 20*b*1 are formed and strongly adhered to the base layer 20*a* Besides the method described above, it is acceptable to form the segments 20*b*1 by a technique such as laser etching or chemical etching after having plated the outer surface of the base layer 20*a* with the metal.

The protective layer 20*c* is formed on an outer circumferential side of the conductive layer 20*b*. The protective layer 20*c* protects the conductive layer 20*b*. As with the base layer 20*a*, a substance which is non-magnetic and has high volume resistivity and excellent heat resistance is suitable for a material of the protective layer 20*c*. Such a substance includes, for example, the heat resistant resin such as the polyimide (PI) and the polyamideimide (PAI), the fiber reinforced resin such as the carbon fiber reinforced plastics (CFRP) and the glass fiber reinforced resin (GFRP), and the like. For the protective layer 20*c*, thicknesses of 20 to 200 μm which are the thicknesses with which the rotational stability of the fixing film 20 is easily obtained is suitable. In this example, the protective layer 20*c* is formed of the PI, and the thickness is set at 50 μm.

The elastic layer 20*d* is formed on an outer circumferential side of the protective layer 20*c*. The elastic layer 20*d* is formed of a heat resistant elastic body such as a silicone rubber. In this example, the elastic layer 20*d* is formed of a good thermal conductivity silicone rubber with a thickness of 200 μm.

The release layer 20*e* is formed on an outer circumferential side of the elastic layer 20*d*. The release layer 20*e* reduces the adhesion of the toner onto the surface of the fixing film 20 and the occurrence of image defects. A material which is excellent in non-adhesiveness is suitable for the release layer 20*e*, and it is possible to use a fluororesin. For example, a perfluoroalkylvinylether (PFA), a polytetrafluoroethylene(PTFE), a tetrafluoroethylene-hexafluoropropylene (FEP), or a tetrafluoroethylene-ethylene (ETFE) can be used. In this example, the PFA with a thickness of 15 μm is used for the release layer 20*e*.

Here, as illustrated in FIG. 1B, the layer configuration of the fixing film 20 in the non-heat generating area is different from the heat generating area (refer to FIG. 1A) in respect of the absence of the conductive layer 20*b*. That is, in the non heat generating area, the fixing film 20 includes, from the inner circumferential side to the outer circumferential side, the base layer 20*a*, the protective layer 20*c*, the elastic layer 20*d*, and the release layer 20*e*.

(2-3) Magnetic Field Generating Unit

Next, a configuration for generating a magnetic field so as to allow the fixing film 20 to generate heat will be described. As described above, the fixing unit 1F includes the magnetic core 30 and the exciting coil 31 (refer to FIG. 3) disposed in the inner space of the fixing film 20.

Figure 4:
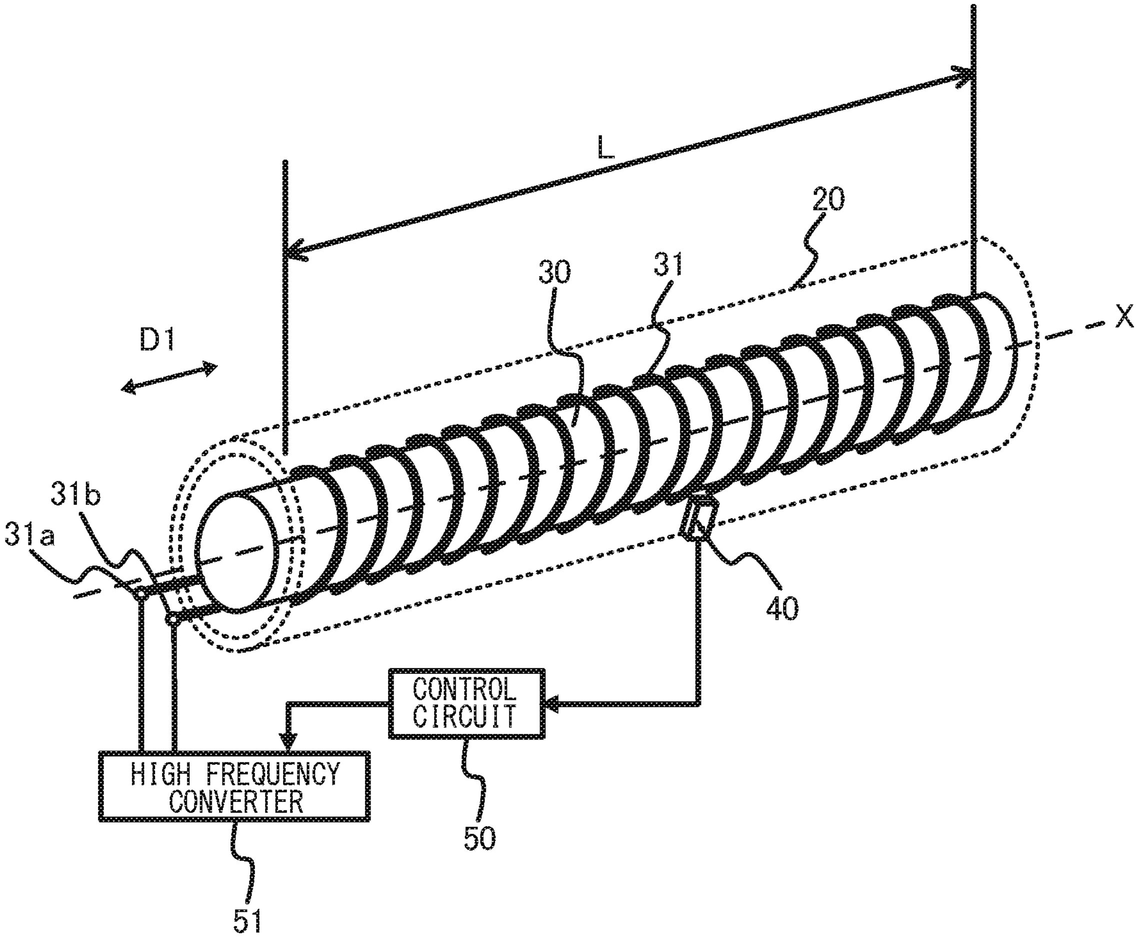
FIG. 4 is a schematic diagram illustrating part of the fixing unit of the example 1.

FIG. 4 is a perspective view (schematic diagram) illustrating a positional relationship among the fixing film 20, the magnetic core 30, and the exciting coil 31. The magnetic core 30 has a cylindrical shape, and secured substantially to the center in the fixing film 20 with a securing member, not shown. The magnetic core 30 acts as a member which induces a magnetic field line (magnetic flux) of an alternating magnetic field generated by the exciting coil 31 to the interior of the fixing film 20 and forms a path (magnetic circuit) of the magnetic field line.

The magnetic core 30 is preferably formed of a material that has a small hysteresis loss and a high relative permeability. As a material of the magnetic core 30, a ferromagnetic material including a high permeability oxide or alloy material, such as a sintered ferrite, a ferrite resin, an amorphous alloy, or a permalloy is preferred. Further, it is preferred to enlarge the cross-section of the magnetic core 30 as much as possible to the extent that a diameter of the magnetic core 30 can be fitted into the interior of the fixing film 20. In this example, the sintered ferrite with a diameter of 15 mm is used. The shape of the magnetic core 30 is not limited to the cylindrical shape, and it is possible to select a prismatic shape and the like.

In this example, the magnetic core 30 is disposed only in the interior of the fixing film 20, and forms an open magnetic circuit. As a modified example, it is acceptable to dispose a member which forms the magnetic circuit also in the exterior of the fixing film 20. Further, it is acceptable to form a closed magnetic circuit by the magnetic circuit forming member described above and the magnetic core 30.

The exciting coil 31 includes a helical portion L in which a single-conductor wire of a copper wire rod with a diameter of 1 to 2 mm coated with the heat resistant polyamideimide is wound over the magnetic core 30 in a helical shape with a number of windings of approximately 10 to 30. An axis of the helical portion L is substantially parallel to the rotational axis X of the fixing film 20. Further, the magnetic core 30 over which the helical portion L is wound overlaps the rotational axis X.

To be noted, as described above, a dimension (longitudinal width) of the magnetic core 30 in the longitudinal direction D1 is longer than the maximum width of the recording material P on which the fixing unit 1F can fix the image. The magnetic core 30 forms the magnetic circuit substantially over the whole length of the fixing film 20 in the longitudinal direction D1. It is suitable that an extension range of the magnetic core 30 in the longitudinal direction D1 includes the central area A1 described above. Further, it is suitable that the extension range of the magnetic core 30 in the longitudinal direction D1 includes an area where the segments 20*b*1 of the conductive layer 20*b* are disposed. Further, it is suitable that the extension range of the magnetic core 30 in the longitudinal direction D1 includes the sheet passing portion, and acceptable that the extension range of the magnetic core 30 in the longitudinal direction D1 includes the whole length of the fixing film 20.

Power supply contact portions 31*a* and 31*b* which are both ends of the exciting coil 31 are electrically coupled to a high frequency converter 51, serving as an alternating current generation circuit Based on a command from a control circuit 50, the high frequency converter 51 supplies a high-frequency anent (alternating anent) to the exciting coil 31. The high-frequency anent flowing through the helical portion L of the exciting coil 31 generates the alternating magnetic field around the fixing film 20.

(2-4) Heat Generation Principle of Fixing Film

Figure 5A:
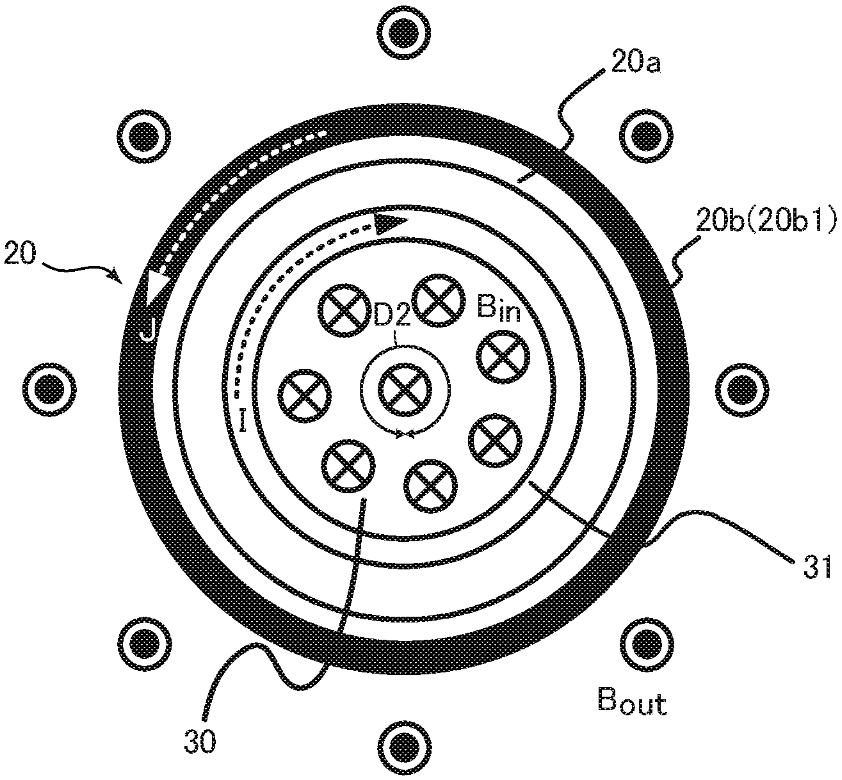
FIGS. 5A and 5B are schematic diagrams illustrating a heat generation principle of the fixing film of the example 1.
Figure 5B:
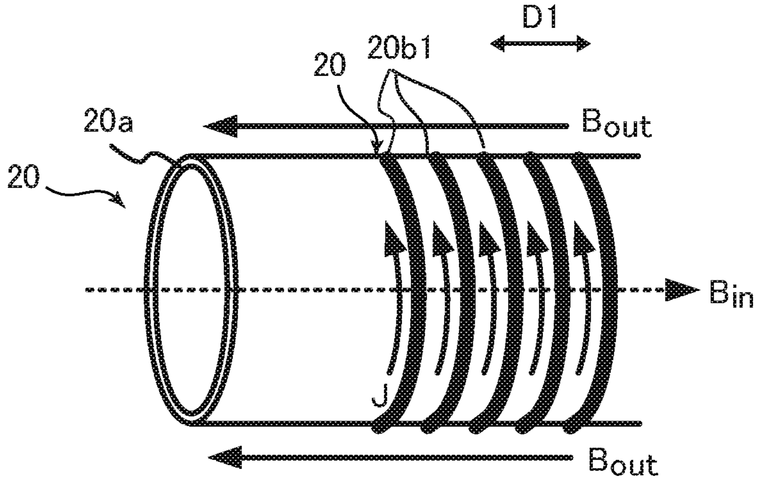

With reference to FIGS. 5A and 5B, a heat generation principle of the fixing film 20 will be described. FIGS. 5A and 5B are schematic diagrams illustrating magnetic fields (Bin, Bout) generated by the exciting coil 31 and electrical currents induced in in the conductive layer 20*b* of the fixing film 20. FIG. 5A illustrates the transverse section of the fixing film 20 and the like, and FIG. 5B is a perspective view illustrating the fixing film 20. To be noted, for the sake of simplicity, the protective layer 20*c*, the elastic layer 20*d*, and the release layer 20*e* are not illustrated in FIGS. 5A and 5B.

In FIG. 5A, the magnetic core 30, the exciting coil 31, and the conductive layer 20*b* are concentrically positioned from the center of the fixing film 20. The magnetic field line Bin toward the depth direction in FIG. 5A and the magnetic in FIG. 5A line Bout toward the front direction in FIG. 5A are respectively illustrated by an arrow-tail symbol and arrow-head symbol.

A moment when the electrical current is increasing in the exciting coil 31 in an arrow I direction in FIGS. 5A and 5B is considered. In this case, the magnetic field line Bin toward the depth direction in FIG. 5A is formed in the inner space of the fixing film 20 mainly through the magnetic core 30, and the magnetic field line Bout returning in the front direction in an outer space of the fixing film 20 is formed. When the magnetic field represented by the magnetic field lines described above is formed, an induced electromotive force is generated over the entire circumference of each segment 20*b*1 of the conductive layer 20*b* in the circumferential direction D2 so as to offset the magnetic field, and the electrical anent circulating in each segment 20*b*1 flows (hereinafter, this electrical current is referred to as a circulation current J).

Since the induced electromotive force is generated in a circulating direction of the conductive layer 20*b*, the circulation current J uniformly flows in the inside of the conductive layer 20*b*. Then, since the magnetic field generated by the exciting coil 31 repeats generation/extinction and a direction reversal by a high frequency anent, the circulation current J flows in a manner of repeating the generation/extinction and the direction reversal in synchronization with the high frequency current. When the electrical current flows in the conductive layer 20*b*, the Joule heat is generated in accordance with electrical resistance of the material (for example, metal) of the conductive layer 20*b*.

The magnetic field lines B in and B out of the magnetic field generated by the exciting coil 31 are substantially parallel to the longitudinal direction D1, and directions become opposite to each other in the inside and the outside of the fixing film 20. Therefore, the circulation current J flows in the circumferential direction D2 of the fixing film 20. As illustrated in FIG. 5B, the circulation current J is generated in each of the electrically separated segments 20*b*1 included in the conductive layer 20*b*.

As described above, in the fixing film 20 of this example, because the high frequency current is made to flow in the exciting coil 31, the circulation current J, serving as an induced current, flows in each of the segments 20*b*1 of the conductive layer 20*b*. Since the circulation current J flows, the conductive layer 20*b* generates the heat.

(2-5) Fixing Operation

Using FIG. 3, an operation of the fixing unit 1F will be described. When an image forming operation has been started, in synchronization with a predetermined timing the fixing unit 1F starts the induction heating of the fixing film 20 by the heat generation principle described above. The predetermined timing has been set beforehand so as to make it possible to heat the fixing film 20 to a target temperature suitable for the fixing before the first recording material P reaches the fixing Trip Nf. In conjunction with the start of heating the fixing film 20, the press roller 22 is rotatably driven by a motor, not shown, and rotates in an arrow Rp direction. The fixing film 20 rotates in an arrow Rf direction by following the press roller 22 by a friction force received from the press roller 22. In the fixing nip N the fixing film 20 passes through a gap between the flat surface portion 21*a* of the nip formation member 21 and the press roller 22.

The high frequency converter 51 (refer to FIG. 4) supplies the high frequency current to the exciting coil 31 via the power supply contact portions 31*a* and 31*b*. The control circuit 50 monitors a surface temperature of the fixing film 20 based on a detection signal of a temperature detection element 40 disposed in a central position of fixing film 20 in the longitudinal direction D1. Then, the control circuit 50 controls power, which is supplied to the exciting coil 31 by the high frequency converter 51, so as to maintain the surface temperature of the fixing film 20 at the target temperature (usually set within a range of about 150° C. to 200° C.).

When the recording material P onto which the image T was transferred by the operation of the image forming unit 1A described above has reached the fixing Trip N the recording material P is conveyed by being Tripped between the fixing film 20 and the press roller 22. Then, during time when the recording material P passes through the fixing nip N an image T on the recording material P is thermally fixed to the recording material P by receiving the heat and pressure from the fixing film 20.

(3) Division Pattern of Conductive Layer

Figure 6A:
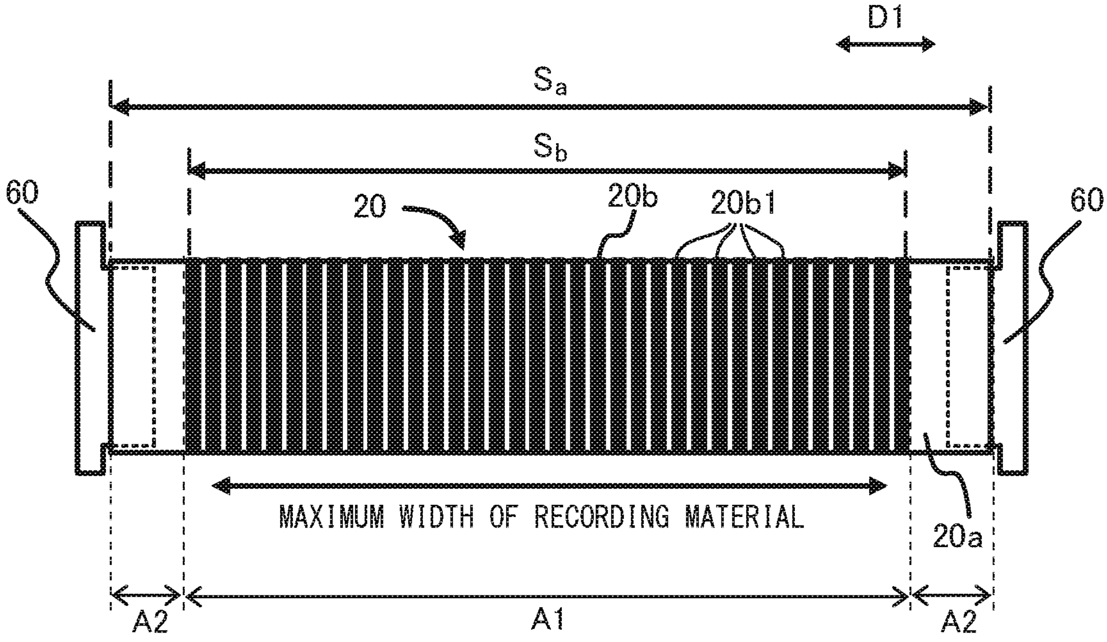
FIG. 6A is a diagram illustrating a pattern of a conductive layer of the example 1.
Figure 6B:
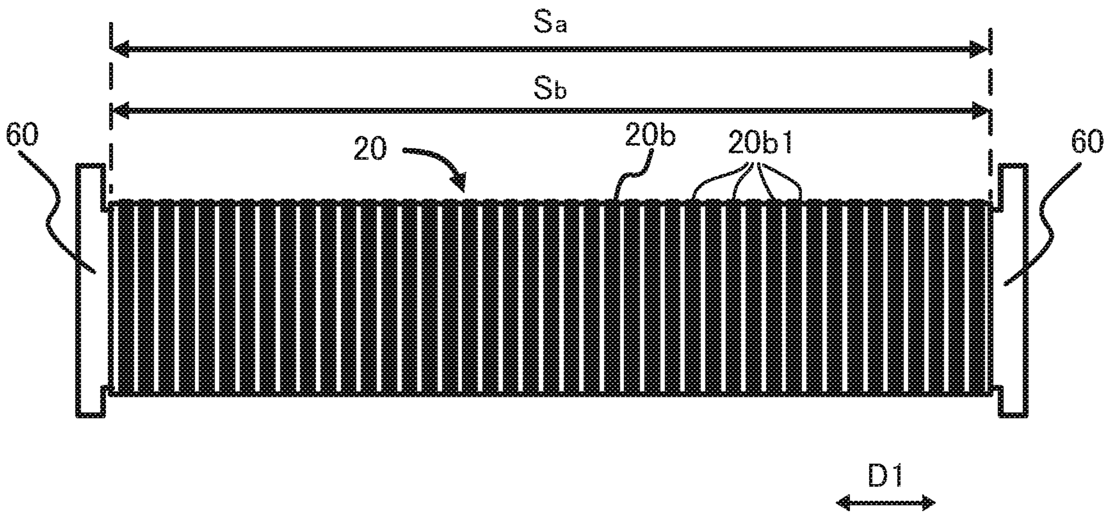
FIG. 6B is a diagram illustrating a pattern of a conductive layer of a comparative example.

Next, details of a division pattern of the conductive layer 20*b* of the fixing film 20 in this example will be described using FIGS. 6A and 6B. FIG. 6A is a schematic diagram illustrating the division pattern of the conductive layer 20*b* in this example, and FIG. 6B is a schematic diagram illustrating a division pattern in which the conductive layer 20*b* is disposed over the whole area in the longitudinal direction D1 as a comparative example. In FIGS. 6A and 6B, for the sake of simplicity, the protective layer 20*c*, the elastic layer 20*d*, and the release layer 20*e* of the fixing film 20 are not illustrated.

As illustrated in FIGS. 6A and 6B, both ends of the fixing film 20 in the longitudinal direction D1 are supported from the interior by the flange members 60. The flange members 60 slidably support the inner surface of the fixing film 20, and play roles of securing the rotational stability of the fixing film 20 and, also, regulating positions of the ends of the fixing film 20 in the longitudinal direction D1.

In this example, a longitudinal width Sa of the fixing film 20 is 240 mm. On the other hand, an area where the conductive layer 20*b* exists is only an area in the central portion having a longitudinal width Sb which is narrower than the longitudinal width Sa of the whole film. The longitudinal width Sb is preferably set wider than a maximum sheet passable width of the recording material. In this example, the maximum sheet passable width of the recording material is the letter (LTR) size of 215.9 mm, and Sb is 220 mm. That is, the conductive layer 20*b* does not exist in a 10-mm area at both end portions of the fixing film 20.

The central area A1 whose longitudinal width is Sb and in which the conductive layer 20*b* is disposed is the first area of this example, and the end areas A2 on both outside of the central area A1 in the longitudinal direction D1 are the second area of this example. So as to secure fixing stability for the maximum size recording material over the whole area in the longitudinal direction D1, the central area A1 preferably includes the sheet passing portion (matching the sheet passing portion, or extending to the outside of the sheet passing portion). In this example, all of the plurality of segments 20*b*1 included in the conductive layer 20*b* are disposed in the central area A1, and the segments 20*b*1 do not exist in the end areas A2. Further, the central area A1 and the end areas A2 of this example are disposed symmetrically with respect to the central position of the fixing film 20.

It will be described that it is possible to reduce a temperature rise in the non-sheet passing portion by not disposing the conductive layer 20*b* in the end areas A2. In this example, in the central area A1 of the fixing film 20, the segments 20*b*1 with the width of 300 μm are disposed at intervals of 200 μm. Therefore, when the alternating magnetic field is generated by supplying the high frequency current to the exciting coil 31 at a time of the image formation, the central area A1 generates the heat by the heat generation principle described above. Further, the distribution of heat generation in the longitudinal direction D1 is substantially uniform in the inside of the central area A1. On the other hand, since the conductive layer 20*b* does not exist in the end areas A2 of the fixing film 20, the circulation current does not flow even in the inside of the alternating magnetic field, so that the end areas A2 do not generate the heat.

In a case where the LTR size recording material having the maximum width size is continuously passed through the fixing unit 1F, the heat of the fixing film 20 is taken by the recording material in the sheet passing portion, but the heat is not taken in the non-sheet passing portion. Therefore, in the comparative example illustrated in FIG. 6B, since the conductive layer 20*b* is disposed over the whole area of the fixing film 20, including the non-sheet passing portion, and generates the heat, a temperature of the non-sheet passing portion of the fixing film 20 gradually increases. If the temperature of the fixing film 20 excessively increases, there is a possibility that durability will be lowered due to, for example, the acceleration of the wear of outer and inner surfaces and changes in physical properties. Further, since an area which is not necessary for fixing the image on the recording material is heated, it is also not preferred in view of energy efficiency.

In contrast, since, in the fixing film 20 of this example, the conductive layer 20*b* is not disposed in the end areas A2, a heat generation amount in the non-sheet passing portion is reduced. Consequently, it is possible to reduce the temperature rise in the non-sheet passing portion in comparison with the comparative example illustrated in FIG. 6B.

(4) Confirmation of Reduction in Temperature Rise in Non-Sheet Passing Portion

Next, an evaluation experiment which confirmed reduction in temperature rise in the non-sheet passing portion will be described. In the experiment, the fixing film 20 of this example illustrated in FIG. 6A and the fixing film 20 of the comparative example illustrated in FIG. 6B were compared.

As a measurement condition, Vitality (trade name, manufactured by Xerox Corporation) which is the LTR size paper having a grammage of 75 gram/square meter (g/m$^2$) is used as the recording material. The abovementioned paper was set in the image forming apparatus 100, and a print operation was performed continuously on 50 sheets of paper at a sheet conveyance speed of 350 millimeters/second (mm/s), at a throughput of 70 sheets per minute.

In the print operation, so as to fix the image on the paper, the control circuit 50 controlled the high frequency converter 51 such that the detection result of the temperature detection unit 40 (refer to FIGS. 2 and 3), that is, a surface temperature in the central portion of the fixing film 20 in the longitudinal direction D1 was maintained at 160° C.

During this print operation, a surface temperature of the non-sheet passing portion of the fixing film 20 was measured, and this example was compared with the comparative example. Here, the surface temperature of the non-sheet passing portion of the fixing film 20 is a surface temperature of the fixing film 20 in a position which is inside of the non-sheet passing portion which is outside of the sheet passing portion corresponding to the maximum width of the recording material, and in the position which is adjacent to end faces of the fixing film 20 in the longitudinal direction D1 and is not likely to be affected by a shape variation such as a twist. In this experiment, the surface temperature of the end portion of the fixing film 20 was measured in a position at a distance of 5 mm from the end face to the central side in the longitudinal direction D1.

Figure 7:
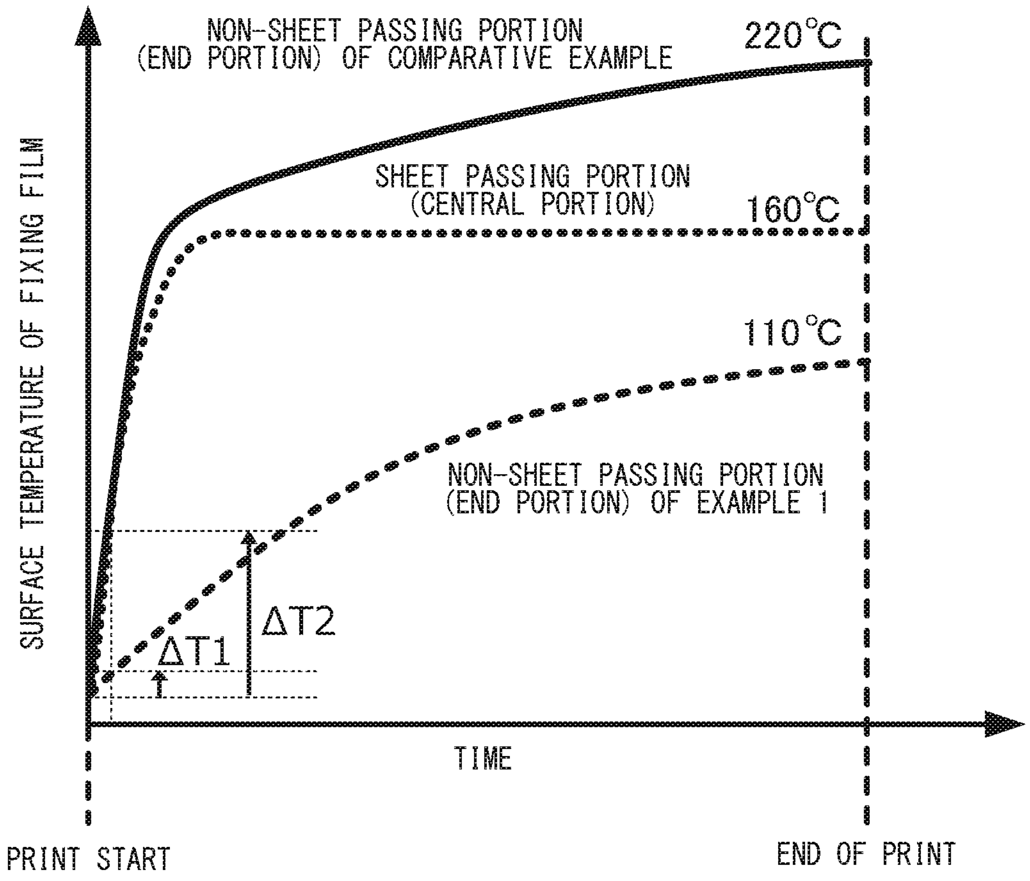
FIG. 7 is a diagram illustrating reduction in temperature rise in a non-sheet passing portion of the fixing film of the example 1.

The measured results are illustrated in FIG. 7. So as to compare the surface temperatures of the non-sheet passing portion and the sheet passing portion, as the sheet passing portion, the surface temperature of the fixing film 20 in the central portion in the longitudinal direction D1 (position of the temperature detection element 40) is also illustrated.

In a case of the comparative example (refer to FIG. 6B), from immediately after the start of the pint operation, the surface temperature of the non-sheet passing portion substantially increased, and rose to about 220° C. at the end of the print operation. In contrast, in a case of this example (refer to FIG. 6A), while the surface temperature of the non-sheet passing portion gradually increased, a temperature rise rate was slower than the rate in the case of the comparative example. Eventually, in this example, the surface temperature of the non-sheet passing portion was 110° C., and remained lower than the surface temperature of the comparative example at the end of the print operation. This is because, while the heat generated in the central area A1 was conducted in the longitudinal direction D1, the heat was not generated in the end areas A2.

As described above, in this example, in a case where the alternating magnetic field is applied to the fixing film 20 (fixing member) at a time of the fixing operation, the heat generation amount in the end areas A2 (second area) of the fixing film 20 is smaller than the heat generation amount in the central area A1 (first area) of the fixing film 20. As illustrated in FIG. 7, in a case where the alternating magnetic field is applied to the whole area of the fixing film 20 in the longitudinal direction D1 in a state where the surface temperatures of the central area A1 (center of the sheet passing portion) and the end area A2 (non-sheet passing portion) are equal to each other, temperature rise amounts per unit of time ΔT1 and ΔT2 in the central and end arms are different from each other. In particular, the temperature rise amount ΔT2 in the end area A2 (the non-sheet passing portion) is smaller than the temperature rise amount ΔT1 in the central area A1 (center of the sheet passing portion). To be noted, the state where the surface temperatures of the central area A1 and the end area A2 are equal to each other refers to a state where the image forming apparatus 100 was left at an ambient temperature (23° C.) for a long enough time without performing the print operation nor the energization of the exciting coil 31 so as to bring the surface temperature substantially uniform across the fixing film 20.

Figure 8A:
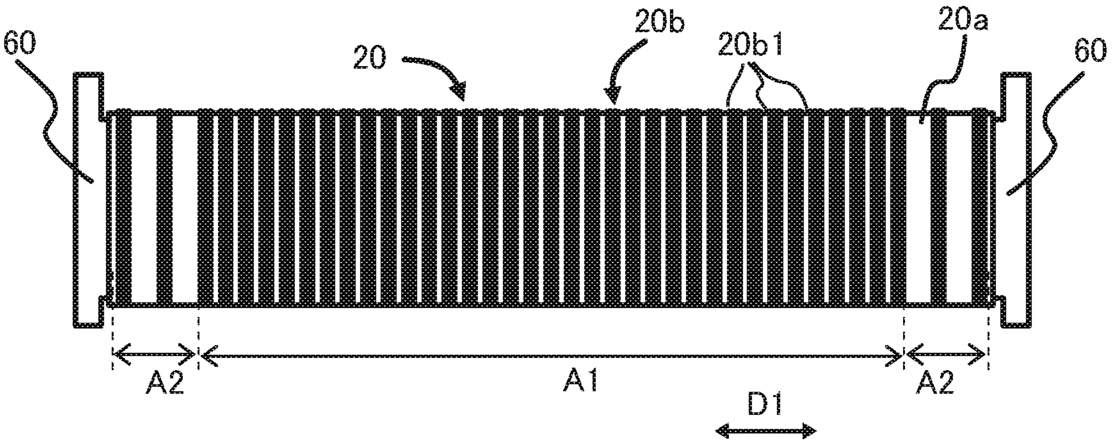
FIGS. 8A and 8B are diagrams showing modified examples of the example 1.

As depicted in the results of the evaluation experiment illustrated in FIG. 7, in this example, by not disposing the conductive layer 20*b* at both end portions of the fixing film 20 in the longitudinal direction D1, it becomes possible to reduce the temperature rise in the non-sheet passing portion at the time of continuous printing Modified Examples To be noted, in this example, the configuration in which the conductive layer 20*b* is not disposed at both end portions of the fixing film 20 at all is illustrated. However, it is not limited to this, and, as illustrated in FIG. 8A, it is also acceptable, in conjunction with disposing some of the segments 20*b*1 also in the end area A2 in the longitudinal direction D1, to more widen a disposition interval (width of the non-heat generating area) between each neighboring two of the segments 20*b*1 in the end area A2 than the disposition interval in the central area A1. For example, in a case where the width of the non-heat generating area in the central area A1 is set at 200 μm, the width of the non heat generating area in the end area A2 can be set at 400 μm. As described above, instead of completely removing the heat generating area in the end areas A2, it is acceptable to reduce the temperature rise in the non-sheet passing portion by lowering the occupying ratio of the conductive layer 20*b* in the end areas A2 in comparison with the central area A1.

Here, the occupying ratio of the conductive layer 20*b* in the central area A1 is a ratio of the sum of longitudinal widths of the segments 20*b*1 positioned in the central area A1 with respect to an overall width of the central area A1 in the longitudinal direction D1. Similarly, the occupying ratio of the conductive layer 20*b* in the end areas A2 is a ratio of the sum of the longitudinal widths of the segments 20*b*1 positioned in the end areas A2 with respect to an overall width of the end areas A2 (the sum of widths of two end areas A2) in the longitudinal direction D1.

Figure 8B:
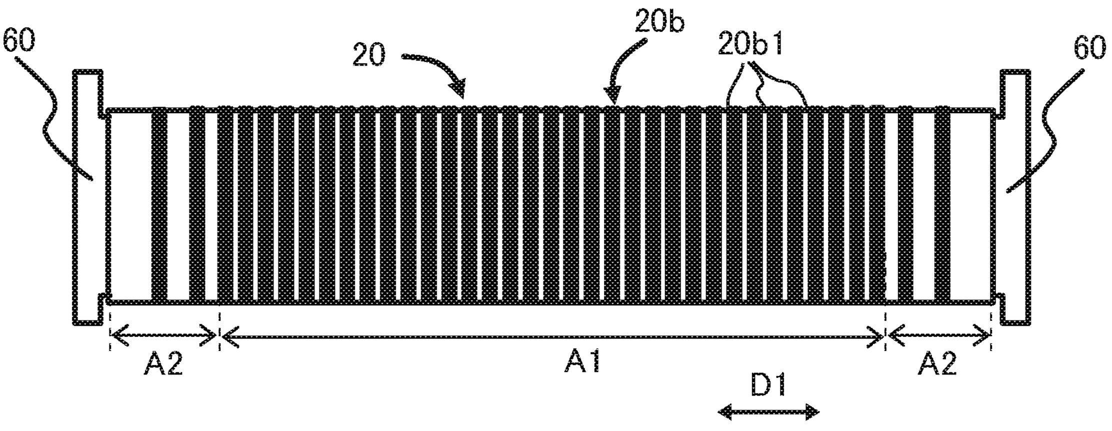

Further, as illustrated in FIG. 8B, instead of making the widths of the non heat generating areas in the end areas A2 uniform not depending on a position in the longitudinal direction D1, it is acceptable to change the widths depending on a position in the longitudinal direction D1. The temperature rise in the non-sheet passing portion of the fixing film 20 changes depending on such as thermal conductivity and heat dissipation properties of the fixing film 20 itself and members in contact with the fixing film 20, and a method of winding the exciting coil 31. Therefore, it is preferred that the arrangement pattern of the segments **20*b*1 of the conductive layer 20*b*** is examined so as to, while satisfying performance such as fixing stability, reduce the temperature rise in the non-sheet passing portion.

As described above, it is possible to reduce the temperature rise in the non-sheet passing portion of the fixing film 20 of this example by applying the arrangement pattern of the segments **20*b*1 of the conductive layer 20*b* so as to lower the heat generation amount in both end portions of the fixing film 20 in the longitudinal direction D1 than the heat generation amount in the central portion. Further, thereby, it is possible to reduce the deterioration of the durability of the fixing film 20** due to the excessive temperature rise in the non-sheet passing portion and wasteful energy consumption accompanying the temperature rise in the non-sheet passing portion.

Example 2

Next, an example 2 will be described. Configurations of the image forming apparatus 100 and the fixing unit 1F except for the fixing film 20 are the same as the example 1. Hereinafter, assuming that elements on which reference characters common to the example 1 are put have substantially the same configurations and functions as the example 1, portions different from the example 1 will be mainly described.

In the example 2, a configuration which can increase the mechanical strength of the end areas A2 of the fixing film 20 by increasing adhesion between the base layer **20*a* and the protective layer 20*c* will be described. To be noted, the base layer 20*a* is an example of an inner layer formed on the inner circumferential side of the conductive layer 20*b* in the fixing film 20, and the protective layer 20*c* is an example of an outer layer formed on the outer circumferential side of the conductive layer 20*b* in the fixing film 20**.

In the example 1 (refer to FIG. 6A), when focusing on the adhesion between each adjacent layers in the layer configuration of the fixing film 20, the adhesion between the base layer **20*a* and the protective layer 20*c* in the central area A1 tends to be higher than the adhesion between the base layer 20*a* and the protective layer 20*c* in the end areas A2. This is because a so-called anchor effect (fastener effect) is delivered by the intermittent existence of the conductive layer 20*b* between the base layer 20*a* and the protective layer 20*c* in the central area A1**.

In a case where the adhesion between the base layer **20*a* and the protective layer 20*c* in the end areas A2 of the fixing film 20 is low, if a lateral-shift force is applied to the fixing film 20 in the longitudinal direction D1, there is a possibility that damage (break) may occur around the end face of the fixing film 20. Here, the lateral-shift force is a force which is applied with respect to the fixing film 20 in the longitudinal direction D1, and, for example, is generated when the user pulls out the recording material stuck in the fixing nip Nf because of a sheet jam or the like, obliquely with respect to the conveyance direction of the recording material. Further, other than a time of treating the sheet jam, the lateral-shift force is generated in a case where a left-right difference exists in a conveyance force due to unevenness in the temperature distribution of the press roller 22 in the longitudinal direction D1 and also in a case where rotational axes of the fixing film 20 and the press roller 22** are not parallel to each other.

In a case where the lateral-shift force described above has been strongly generated, the end areas A2 of the fixing film 20 is strongly pressed to the flange members 60 (refer to FIG. 8A), and low adhesion between the base layer **20*a* and the protective layer 20*c* result in low breaking strength of the fixing film 20. Consequently, in comparison with the comparative example (refer to FIG. 6B), there is a possibility that the end portion of the fixing film 20 pressed to the flange members 60 by the lateral-shift force may be likely to be broken and the durability or the robustness of the fixing unit 1**F may decrease.

Separately from the segments **20*b*1 which generate the heat by allowing the circulation current J to flow, the conductive layer 20*b* of this example includes dummy segments 20*b*2, each of which is formed electrically discontinuously in at least one place in the circumferential direction D2 so as not to allow the circulation-current J to flow. The dummy segments 20*b*2 can be also referred to as anon heat generating area in which the conductive layer 20*b*** exists.

Figure 9A:
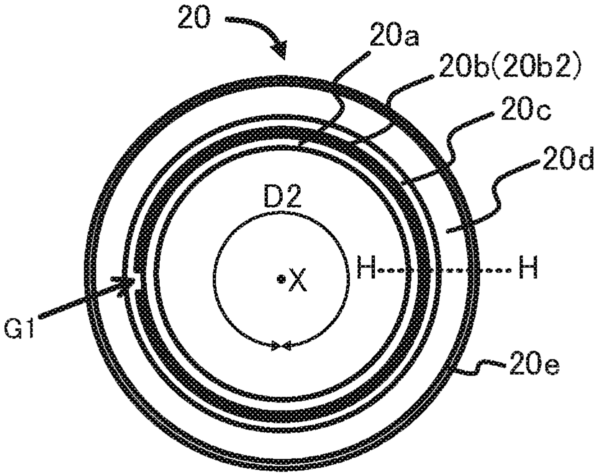
FIG. 9A is a transverse section of a fixing film of an example 2.
Figure 9B:
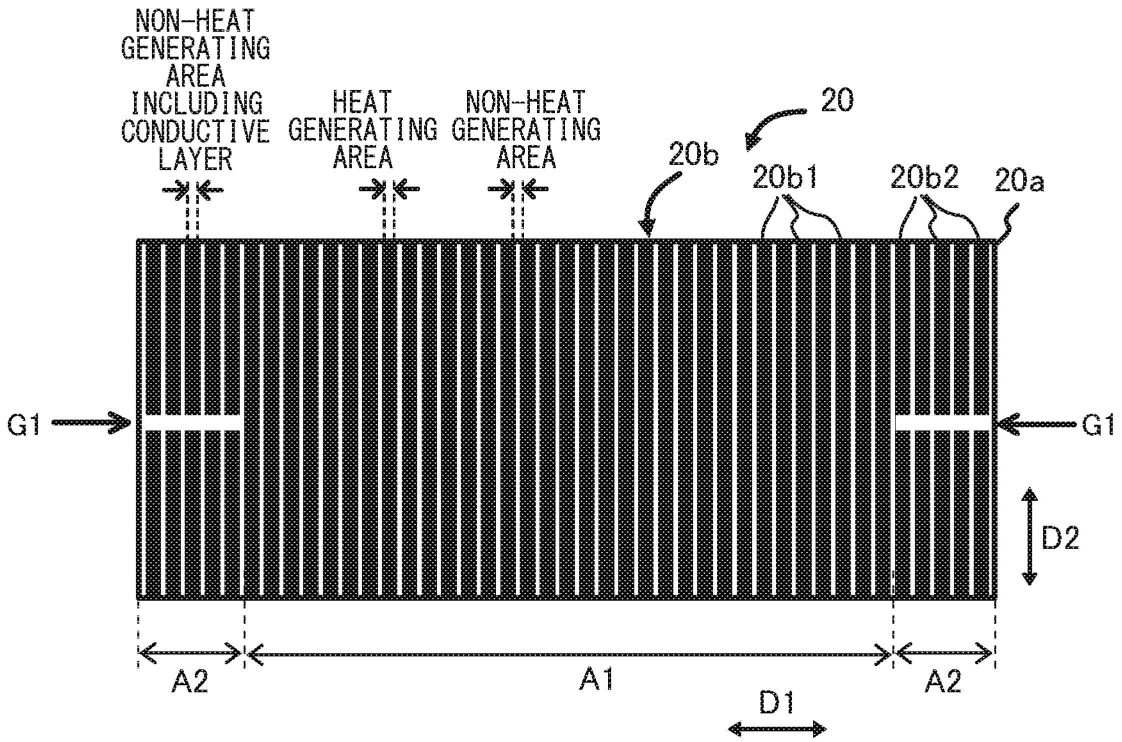
FIG. 9B is a longitudinal section of the fixing film of the example 2.

FIGS. 9A and 9B illustrate the fixing film 20 of this example. FIG. 9A is a schematic diagram illustrating a transverse section of the fixing film 20 cut at a position passing through one of the dummy segments **20*b*2. FIG. 9B is an unfolded view in which the fixing film 20 is cut at the line H-H in FIG. 9A and developed on a plane. To be noted, for the sake of simplicity, the protective layer 20*c*, the elastic layer 20*d*, and the release layer 20*e* are not illustrated in FIG. 9**B.

As illustrated in FIG. 9B, the fixing film 20 of this example includes the central area A1 and the end areas A2. The longitudinal widths of the central area A1 and the end areas A2 are set to be similar to the example 1. In the central area A1, a plurality of segments **20*b*1 are disposed at regular intervals. At least some of a plurality of dummy segments 20*b*2 is disposed in the end area A2. In a case of this example, all of the plurality of dummy segments 20*b*2 are disposed in the end areas A2. Each dummy segment 20*b*2 is formed of the same material as the segments 20*b*1 of the conductive layer 20*b*, and is formed electrically discontinuously in at least a predetermined gap portion G1** (discontinuous portion, notch portion).

A layer configuration of the fixing film 20 in a longitudinal position where the dummy segments **20*b*2 exist (non-heat generating area including the conductive layer 20*b*) will be described using FIG. 9A In the longitudinal position where any one of the dummy segments 20*b*2 exists, the fixing film 20 includes, from the inner circumferential side to the outer circumferential side, the base layer 20*a*, the conductive layer 20*b*, the protective layer 20*c*, the elastic layer 20*d*, and the release layer 20*e*. Note that this portion of the conductive layer 20*b* is one of the dummy segments 20*b*2, and the gap portion G1 is disposed in at least one place in the circumferential direction D2. That is, each dummy segment 20*b*2, not like the segments 20*b*1, does not form a closed electrical circuit closed around the rotational axis of the fixing film 20**.

So as to form the gap portion G1, it is possible to use a method similar to the method used for forming the non-heat generating area in the gap between each neighboring two of the segments **20*b*1 in course of the preparation of the conductive layer 20*b*. That is, when coating paint for forming the conductive layer 20*b* on the base layer 20*a*, a dividing portion (non-coating portion) can be formed in advance in a portion corresponding to the gap portion G1 by the common technique such as the masking process. Besides the method described above, it is acceptable to form the gap portion G1, after having plated the outer surface of the base layer 20***a* with metal, by removing a part of the plated metal in the circumferential direction D2 using a technique such as laser etching and chemical etching.

As described above, since each dummy segment 20*b*2 does not form the closed electric circuit, even if the alternating magnetic field is generated around the dummy segment 20*b*2 by the exciting coil 31 to which the high frequency current is supplied, the circulation anent does not flow in the dummy segment 20*b*2. Therefore, in the longitudinal position where the dummy segments 20*b*2 exist, the fixing film 20 does not generate the heat.

Therefore, as with the example 1, the fixing film 20 of this example can reduce the temperature rise in the non-sheet passing portion.

Further, according to this example, since the conductive layer 20*b* also exists in the end areas A2 in a form of the dummy segments 20*b*2, the adhesion between the base layer 20*a* and the protective layer 20*c* is improved by the anchor effect. Thereby, in comparison with the example 1, the breaking strength of the end portions of the fixing film 20 is improved, and the durability and robustness of the fixing unit 1F are improved.

Evaluation of Breaking Strength

Next, an evaluation experiment by which an effect of improving the breaking strength of the fixing film 20 by this example was confirmed will be described. In the experiment, the breaking strength against the lateral-shift force was compared between the fixing film 20 of the example 1 illustrated in FIG. 6A and the fixing film 20 of this example illustrated in FIGS. 9A and 9B.

As an evaluation method, while rotating the fixing film 20 attached to the fixing unit 1F, the lateral-shift force was intentionally generated in the longitudinal direction D1, and the lateral-shift force at which an end portion of the fixing film 20 breaks was compared. So as to generate the lateral-shift force, an angle (intersection angle) formed between the rotational axes of the fixing film 20 and the press roller 22 was gradually increased from 0 degree. The larger the intersection angle becomes, the stronger the lateral-shift force is generated and the stronger the end portion of the fixing film 20 is pressed to the flange member. The lateral-shift force at each intersection angle was measured by a load cell disposed to the flange member. Then, the lateral-shift force was gradually increased, and the breaking strength was measured based on whether or not the end portion of the fixing film 20 was broken at each lateral-shift force.

Results of the evaluation experiment are shown in Table 1. In Table 1, a case where the break of the end portion of the fixing film 20 occurred at each lateral-shift force is indicated as "no good", and a case where the break of the end of the fixing film 20 did not occur at each lateral-shift force is indicated as "good".

TABLE 1

| Lateral-Shift Force (gf = gram forces) | Example 1 | Example 2 |
|---|---|---|
| 400 gf | Good | Good |
| 800 gf | Good | Good |
| 1200 gf | No Good | Good |
| 1600 gf | — | Good |
| 2000 gf | — | No Good |

As shown in Table 1, in the fixing film 20 of the example 1, the break of the end portion of the fixing film 20 did not occur up to the lateral-shift force of 800 gf. However, when the lateral-shift force of 1200 gf was applied, the end portion of the fixing film 20 was deformed and bent, and finally led to the break.

On the other hand, in the fixing film 20 of this example, the break of the end portion did not occur when the lateral-shift force of 1600 gf was applied. It is considered that, since the conductive layer 20*b* exists also in the end areas A2 in this example, the breaking strength is high because of high adhesion between the base layer 20*a* and the protective layer 20*c* in comparison with the example 1 in which the conductive layer 20*b* does not exist in the end areas A2.

Modified Example

Figure 10A:
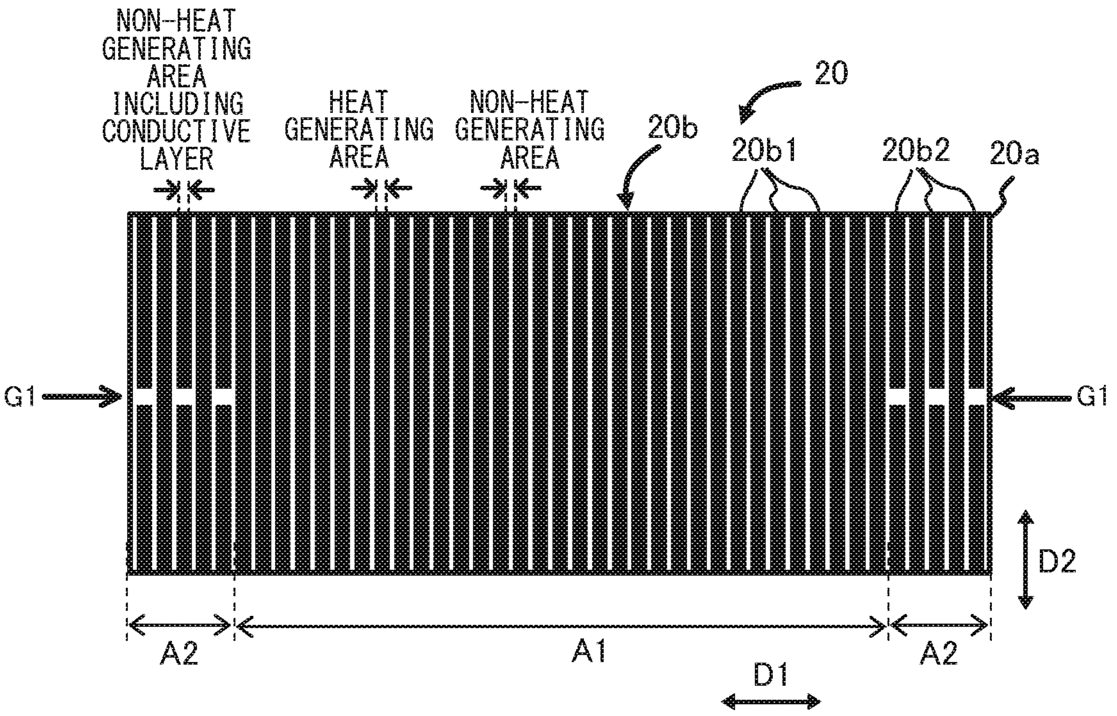
FIGS. 10A and 10B are diagrams showing modified examples of the example 2.
Figure 10B:
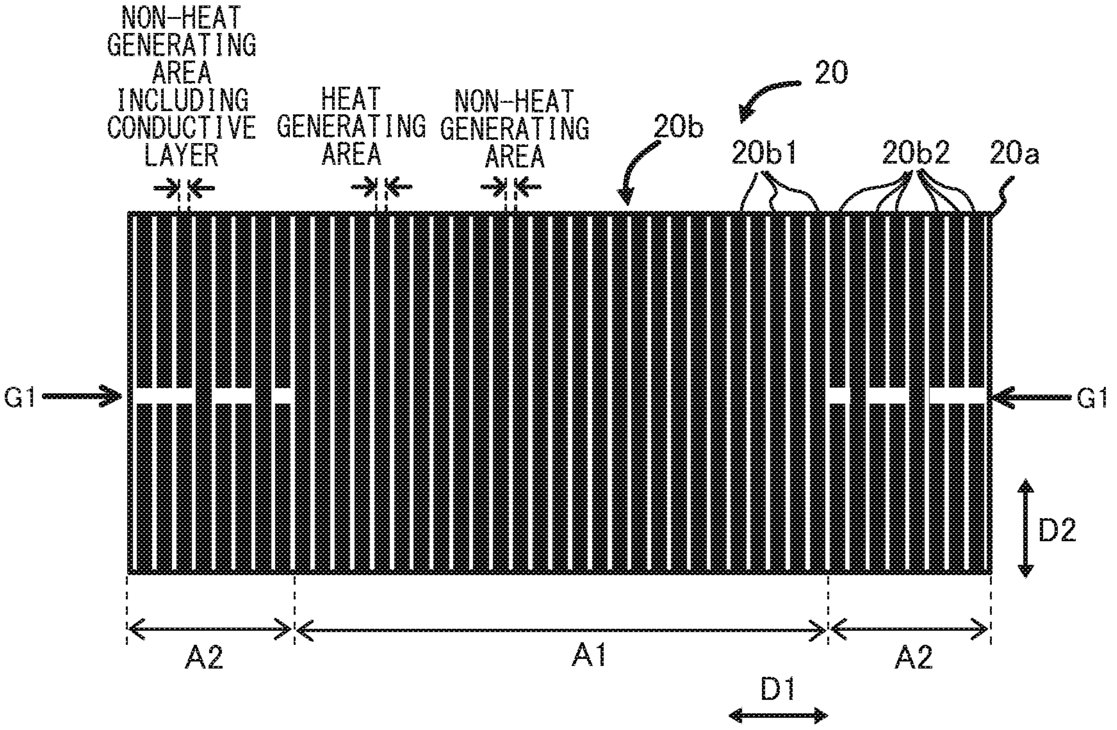

To be noted, in this example, the whole of the conductive layer 20*b* in the end areas A2 is formed by using the dummy segments 20*b*2 including the gap portions G1. Instead of this, for example, as illustrated in FIGS. 10A and 10B, it is acceptable to dispose the dummy segments 20*b*2 including the gap portions G1 in part of the conductive layer 20*b* in the end areas A2 and dispose the segments 20*b*1 not including the gap portions G1 in the other part of the conductive layer 20*b* in the end areas A2. In that case, as illustrated in FIG. 10A, it is acceptable to dispose the dummy segments 20*b*2 and the segments 20*b*1 such that the dummy segments 20*b*2 appear with a certain frequency (for example, alternately). Further, as illustrated in FIG. 10B, it is acceptable to change an appearance frequency of the dummy segments 20*b*2 depending on a position in the longitudinal direction D1. Further, it is acceptable to dispose the dummy segments 20*b*2 also in the central area A1. In that case, the appearance frequency of the dummy segments 20*b*2 in the central area A1 is lower than the appearance frequency in the end areas A2.

That is, it is acceptable that the occupying ratio of the segments 20*b*1 in the central area A1 (first area) is higher than the occupying ratio of the segments 20*b*1 in the end areas A2 (second area) and the occupying ratio of the segments 20*b*2 in the end areas A2 (second area) is higher than the occupying ratio of the dummy segments 20*b*2 in the central area A1 (first area). To be noted, the occupying ratio of the segments 20*b*1 in the central area A1 is a ratio of the sum of the longitudinal widths of the segments 20*b*1 positioned in the central area A1 with respect to the overall width of the central area A1, and the same also applies to the other occupying ratios. With this configuration, while generating the heat in the central area A1 at the time of the fixing operation, it is possible to suppress the temperature rise in the non-sheet passing portion. Also in this example, it is preferred that the arrangement pattern of the segments in the conductive layer 20*b* is examined so as to, depending on the configuration of the fixing unit 1F, while satisfying the performance such as the fixing stability, reduce the temperature rise in the non-sheet passing portion.

As described above, according to this example, it is possible to reduce the temperature rise in the non-sheet passing area, and also possible to improve the mechanical strength of the end area A2 of the fixing film 20.

Example 3

Next, an example 3 will be described. Configurations of the image forming apparatus 100 and the fixing unit 1F except for the fixing film 20 are the same as the example 1. Hereinafter, assuming that elements on which reference characters common to the examples 1 and 2 are put have substantially the same configurations and functions as the examples 1 and 2, portions different from the examples 1 and 2 will be mainly described.

The example 3 is an example which can further improve the mechanical strength of the end area A2 of the conductive layer 20*b* in comparison with the example 2. In the evaluation experiment described above, when a state of the end portions of the fixing film 20 of the example 2 had been examined in detail, it was revealed that, immediately before the occurrence of the break, cracks occur along the gap portions G1 of the dummy segments 20*b*2.

In the example 2, the gap portions G1 of the plurality of dummy segments 20*b*2 are disposed in a row in the longitudinal direction D1. Therefore, when the end portion of the fixing film 20 was strongly pressed to the flange member by the lateral-shift force, stress was concentrated on a position of the gap portion G1, where the conductive layer 20*b* does not exist, and there was a possibility that the cracks would have become likely to occur. Then, it is considered that the break of the end portion of the fixing film 20 progressed from the cracks occurred in the gap portions G1 as the starting point Therefore, to further improve the mechanical strength of the fixing film 20, a reduction of the cracks in the gap portions G1 which becomes the starting point of the break of the end portion is considered.

Therefore, in this example, positions of the gap portions G1 in the circumferential direction D2 are disposed in a manner different from each other among the plurality of dummy segments 20*b*2.

Figure 11:
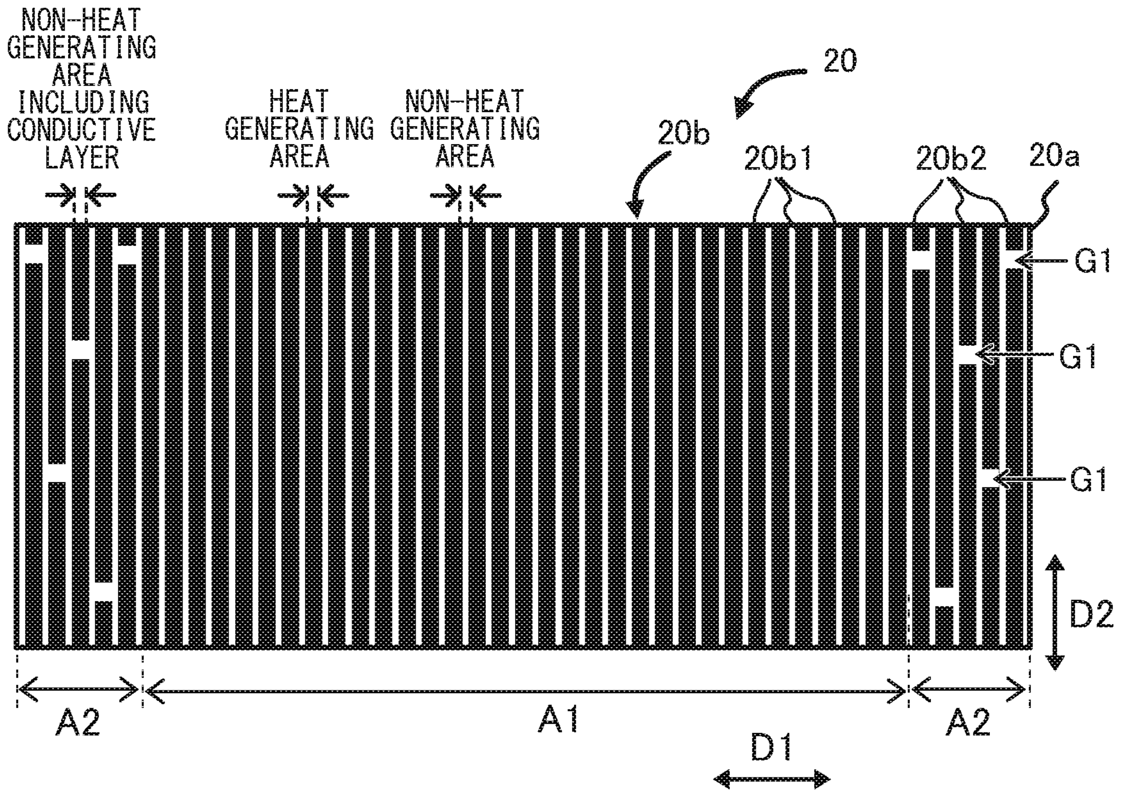
FIG. 11 is a diagram showing a pattern of a conductive layer of an example 3.

FIG. 11 illustrates a pattern of the conductive layer 20*b* in this example. As with FIG. 9B, FIG. 11 is an unfolded view illustrating the fixing film 20 which is cut in one place in the circumferential direction D2 and developed on a plane.

The conductive layer 20*b* of the fixing film 20 of this example includes the segments 20*b*1 in which the circulation anent flows and the dummy segments 20*b*2 in which the circulation anent does not flow. In the central area A1 of the fixing film 20, only the segments 20*b*1 are provided, and, in the end areas A2, only the dummy segments 20*b*2 are provided.

As illustrated in FIG. 11, positions of the gap portions G1 in the circumferential direction D2 are different from each other among the dummy segments 20*b*2 disposed in the end areas A2. By varying the positions of the gap portions G1 as described above, it is possible to mitigate the concentration of the stress on one place in the circumferential direction D2, and possible to reduce the occurrence of the cracks.

To be noted, if the positions of the gap portions G1 are not the same among all of the plurality of dummy segments 20*b*2, it can be said that the positions of the gap portions G1 in the circumferential direction D2 are different from each other. For example, if the positions of the gap portions G1 of a first group and a second group among the plurality of dummy segments 20*b*2 are different from each other, it is acceptable to position the gap portions G1 at the same position in each group.

By varying the positions of the gap portions G1 between each of adjacent dummy segments 20*b*2 as with this example, it is possible to more effectively mitigate the stress concentration. Further, a configuration in which any two among all of the dummy segments 20*b*2 do not have the gap portions G1 at the same position is also useful for more effectively mitigating the stress concentration.

Evaluation of Breaking Strength

Next, an evaluation experiment by which degree of improvement in the breaking strength of the end portion of the fixing film 20 by this example was confirmed will be described. An evaluation method is similar to the method described in the example 2. In the experiment, the breaking strength against the lateral-shift force was compared between the fixing film 20 of the example 2 and the fixing film 20 of this example.

Results of the evaluation experiment are shown in Table 2. In Table 2, a case where the break of the end of the fixing film 20 occurred at each lateral-shift force is indicated as "no good", and a case where the break of the end of the fixing film 20 did not occur at each lateral-shift force is indicated as "good".

TABLE 2

| Lateral-Shift Force (gf = gram forces) | Example 2 | Example 3 |
|---|---|---|
| 800 gf | Good | Good |
| 1200 gf | Good | Good |
| 1600 gf | Good | Good |
| 2000 gf | No Good | Good |
| 2400 gf | — | No Good |

As shown in Table 2, while, in a case of the fixing film 20 of the example 2, the break occurred when the lateral-shift force of 2000 gf was applied, in a case of the fixing film 20 of this example, the break did not occur even when the lateral-shift force of 2000 gf was applied. While, in the case where the lateral-shift force of 2000 gf was applied to the fixing film 20 of the example 2, the cracks occurred in the positions of the gap portions G1 immediately before the break, the cracks did not occur in the case of this example.

In this example, it is considered that, by varying the positions of the gap portions G1 depending on a position in the longitudinal direction D1, the stress concentration on the gap portions G1 was mitigated so as to increase the breaking strength.

Modified Example

Figure 12A:
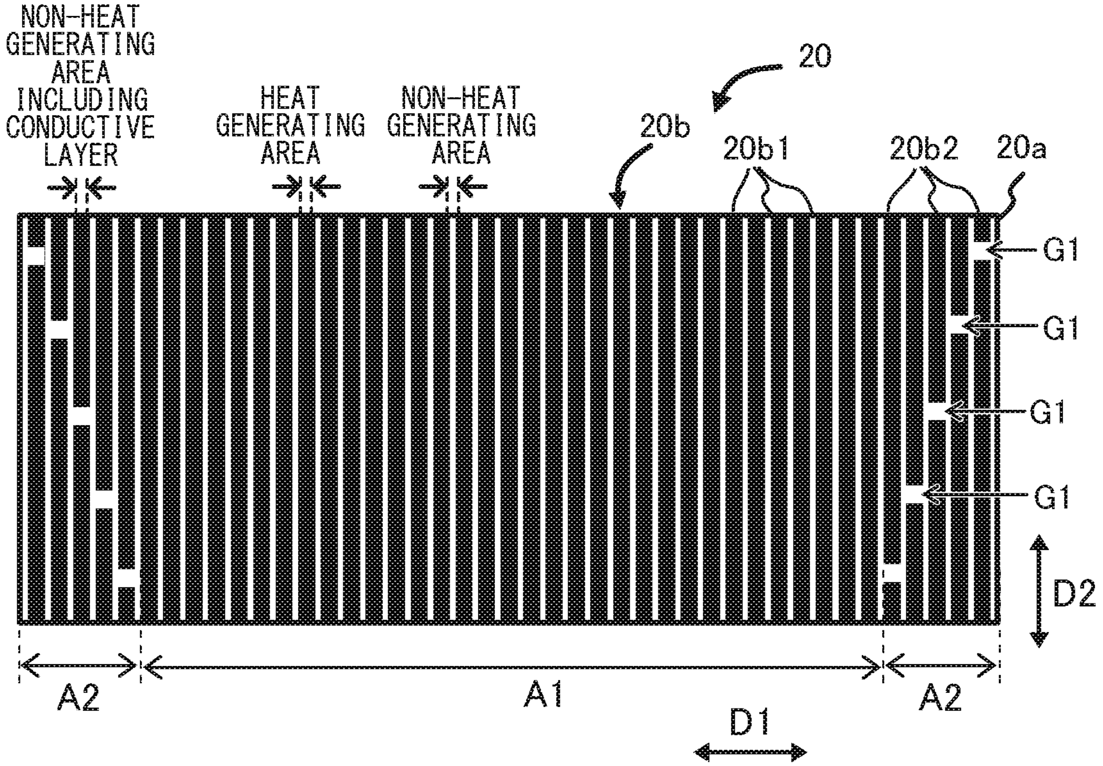
FIGS. 12A and 12B are diagrams showing modified examples of the example 3.
Figure 12B:
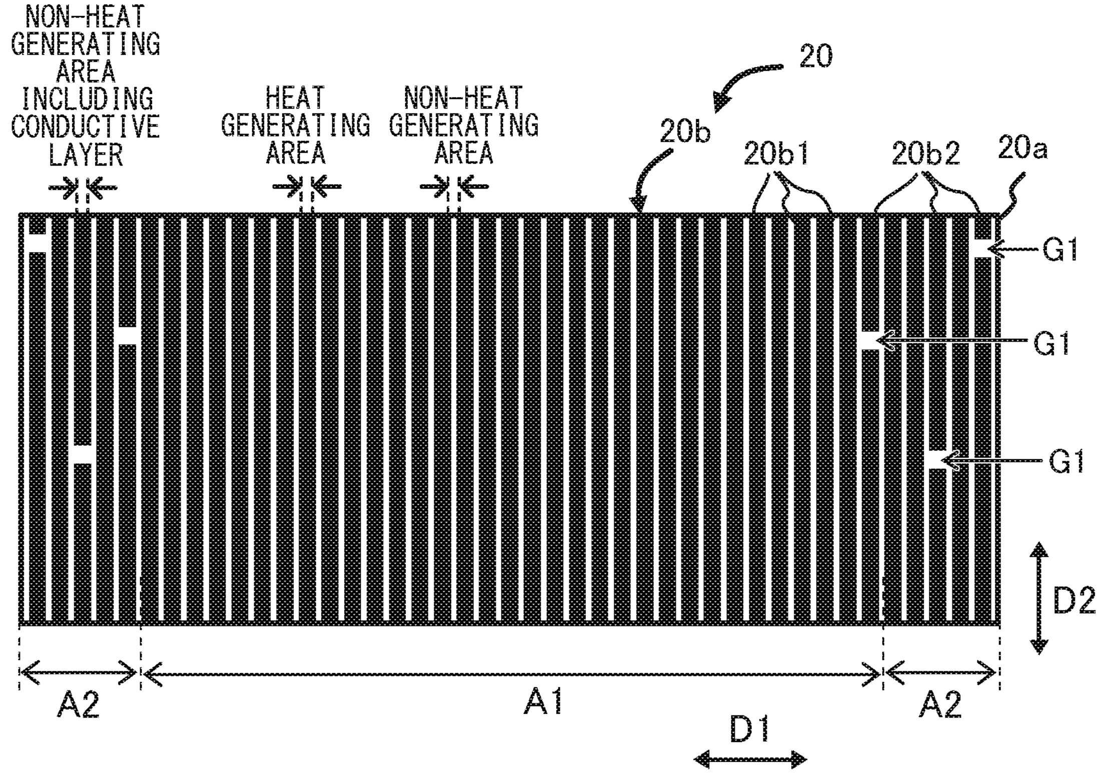

To be noted, a method to vary the positions of the gap portions G1 among the dummy segments 20*b*2 is not limited to the method described above. For example, as illustrated in FIG. 12A, it is acceptable to vary the positions of the gap portions G1 helically. Further, as illustrated in FIG. 12B, it is acceptable to dispose the dummy segments 20*b*2 in a manner of skipping from one to another (that is, mixed with the segments 20*b*1) in the end areas A2 and vary the positions of the gap portions G1 among the dummy segments 20*b*2.

As described above, according to this example, it is possible to reduce the temperature rise in the non-sheet passing portion, and, also, possible to further improve the mechanical strength of the end areas A2 of the fixing film 20.

Example 4

Next, an example 4 will be described. Configurations of the image forming apparatus 100 and the fixing unit 1F except for the fixing film 20 are the same as the example 1. Hereinafter, assuming that elements on which reference characters common to the examples 1 to 3 are put have substantially the same configurations and functions as the examples 1 to 3, portions different from the examples 1 and 2 will be mainly described.

In the examples 1 to 3, the methods for reducing the temperature rise in the non-sheet passing portion and improving the adhesion between the base layer 20*a* and the protective layer 20*c* by the pattern of the conductive layer 20*b* of the fixing film 20 are described. In this example, it will be described that it is also possible to reduce the temperature rise in the non-sheet passing portion by varying the thickness, width, or material of the segment of the conductive layer 20*b*.

The fixing film 20 of this example includes the segments 20*b*1 in both of the central area A1 and the end areas A2 (for example, refer to FIG. 6B). Besides, at least one of the thickness, width, or material of the segments 20*b*1 in the end areas A2 is differentiated from that of the segments 20*b*1 in the central area A1 so that a resistance value in the circumferential direction D2 (hereinafter referred to as circulation resistance) of the segments 20*b*1 in the end areas A2 will become higher than the circulation resistance of the segments 20*b*1 in the central area A1.

For example, when the thickness of the segments 20*b*1 in the end area A2 is further thinned than the thickness of the segments 20*b*1 in the central area A1, the circulation resistance of the segments 20*b*1 in the end area A2 increases, and the heat generation amount in the end area A2 decreases. Further, when the width of each segment 20*b*1 in the end area A2 is more decreased than the width of each segment 20*b*1 in the central area A1, the circulation resistance of the segments 20*b*1 in the end area A2 increases, and the heat generation amount in the end area A2 decreases. To be noted, since the anchor effect itself is delivered even in a case where the thickness or width of each segment 20*b*1 in the end area A2 is varied from the central area A1, the adhesion between the base layer 20*a* and the protective layer 20*c* in the end area A2 is improved.

It is acceptable to reduce the heat generation amount in the end areas A2 by using a material with the volume resistivity higher than the volume resistivity of a material of the segments 20*b*1 in the central area A1 as a material of the segments 20*b*1 in the end area A2.

To be noted, in a case of the dummy segments 20*b*2 described in the examples 2 and 3 (i.e., segments in which the circulation current does not flow due to the gap portions G1), the circulation current does not flow regardless of the volume resistivity. Therefore, in a case where the dummy segments 20*b*2 are disposed, regardless of the volume resistivity, it is acceptable to select a material which can improve the mechanical strength or the adhesion between the base layer 20*a* and the protective layer 20*c* of the segment itself.

As described above, according to this example, it is possible to reduce the temperature rise in the non-sheet passing portion. Further, this example can be implemented in combination with the examples 1 to 3.

Other Modifications

In the fixing film described in the examples 1 to 3, the segments 20*b*1 or the dummy segments 20*b*2 of the conductive layer 20*b* is not disposed in the end faces of the fixing film 20 in the longitudinal direction D1. Instead of this, so as to increase the breaking strength of the end faces of the fixing film 20, it is acceptable to change the pattern of the conductive layer 20*b* so that one of the segments 20*b*1 or one of the dummy segments 20*b*2 will be exposed at the end face.

In the examples 1 to 4, as the layer configuration of the fixing film 20, a configuration of five layers including the base layer 20*a*, the conductive layer 20*b*, the protective layer 20*c*, the elastic layer 20*d*, and the release layer 20*e* is illustrated. The layer configuration of the fixing film 20 is not limited to this, and it is preferred to appropriately select an optimum layer configuration in consideration of such as fixability and the durability.

In the examples 1 to 4, the fixing unit 1F and the image forming apparatus 100 including a center referenced sheet passing configuration in which the center of the sheet passing portion of the recording material P matches the center of the fixing unit 1F in the longitudinal direction D1 are described. Instead of this, for example, in a case of the fixing unit 1F and the image forming apparatus 100 including a side referenced sheet passing configuration in which the end of the recording material P in the longitudinal direction D1 matches a predetermined position of the fixing unit 1F in the longitudinal direction D1, a positional relationship between the sheet passing portion and the non-sheet passing portion becomes different. In such a case, it is acceptable to configure the conductive layer 20*b* such that the heat generation amount in the end portion on a side of the non-sheet passing portion of the fixing film 20 becomes less than the heat generation amount in the central portion.

In the examples 1 to 4, the configuration in which the alternating magnetic field for allowing the conductive layer 20*b* to generate the heat is generated by the exciting coil 31 inserted into the inner space of the fixing film 20 is described. Instead of this or in addition to the exciting coil 31, it is acceptable to dispose a coil, which generates the alternating magnetic field, in the outside of the fixing film 20.

In the examples 1 to 4, as an example of the tubular fixing member, the fixing film 20 which is a flexible endless film (belt) is described. It is not limited to this, and it is acceptable to use a rigid cylindrical roller member (fixing roller) for the tubular fixing member.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read cut and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

Other Embodiments

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-063233, filed on Apr. 6, 2022, which is hereby incorporated by reference herein in its entirety.

What is claimed is:

1. A fixing member comprising:

a conductive layer configured to generate heat in a case where a circulation current in a circumferential direction of the fixing member having a tubular shape is induced, wherein the conductive layer includes a plurality of segments arranged in a row in a longitudinal direction of the tubular shape and electrically separated from each other, where each of the plurality of segments is formed continuously over an entire circumference of the tubular shape in the circumferential direction, wherein the conductive layer is configured such that a heat generation amount in an end portion of the fixing member in the longitudinal direction is less than a heat generation amount in a central portion of the fixing member in the longitudinal direction in a case where an alternating magnetic field is applied to a whole area of the fixing member in the longitudinal direction in a state where a temperature of the central portion of the fixing member is equal to a temperature of the end portion of the fixing member, and wherein the fixing member is an endless film having flexibility.

2. The fixing member according to claim 1, wherein a first area is an area of the fixing member in the longitudinal direction and includes the central portion, wherein a second area is the area of the fixing member in the longitudinal direction and includes the end portion, and wherein all of the plurality of segments are disposed in the first area.

3. The fixing member according to claim 1, wherein a first area is an area of the fixing member in the longitudinal direction and includes the central portion, wherein a second area is an area of the fixing member in the longitudinal direction and includes the end portion, wherein part of the plurality of segments is disposed in the first area, wherein another part of the plurality of segments is disposed in the second area, and wherein a distance between each neighboring two of the plurality of segments in the second area is wider than a distance between each neighboring two of the plurality of segments in the first area.

4. The fixing member according to claim 1, further comprising:

an inner layer formed on an inner circumferential side of the conductive layer; and an outer layer formed on an outer circumferential side of the conductive layer, wherein the conductive layer further includes a plurality of dummy segments which are formed of the same material as the plurality of segments and each of which is electrically discontinuous in at least one place in the circumferential direction, wherein a first area is an area of the fixing member in the longitudinal direction and includes the central portion, wherein a second area is the area of the fixing member in the longitudinal direction and includes the end portion, and wherein at least part of the plurality of dummy segments is disposed in the second area.

5. The fixing member according to claim 4, wherein an occupying ratio of the plurality of segments in the first area is higher than an occupying ratio of the plurality of segments in the second area, and wherein an occupying ratio of the plurality of dummy segments in the second area is higher than an occupying ratio of the plurality of dummy segments in the first area.

6. The fixing member according to claim 4, wherein a place where each of the plurality of dummy segments is discontinuous in the circumferential direction is different among the plurality of dummy segments.

7. The fixing member according to claim 1, wherein a first area is an area of the fixing member in the longitudinal direction and includes the central portion, wherein a second area is the area of the fixing member in the longitudinal direction and includes the end portion, wherein part of the plurality of segments is disposed in the first area, wherein another part of the plurality of segments is disposed in the second area, and wherein a resistance value when an electrical current is passed through the plurality of segments in the second area in the circumferential direction is larger than a resistance value when an electrical current is passed through the plurality of segments in the first area in the circumferential direction.

8. The fixing member according to claim 7, wherein a thickness of each of the plurality of segments in the second area is smaller than a thickness of each of the plurality of segments in the first area.

9. The fixing member according to claim 7, wherein a width of each of the plurality of segments in the second area in the longitudinal direction is smaller than a width of each of the plurality of segments in the first area in the longitudinal direction.

10. The fixing member according to claim 7, wherein a volume resistivity of a material of the plurality of segments in the second area is larger than a volume resistivity of a material of the plurality of segments in the first area.

11. A fixing unit comprising:

an endless film having flexibility and including a conductive layer;

a magnetic field generating member configured to generate an alternating magnetic field so as to induce circulation flowing in a circumferential direction of the endless film in the conductive layer so that heat is generated in the conductive layer, the magnetic field generating member including a coil that is disposed in an inner space of the endless film and that extends helically in a longitudinal direction of the endless film;

a nip formation member disposed in an inner space of the endless film; and a pressing member configured to come into contact with an outer surface of the endless film and to form a nip with the nip formation member across the endless film, wherein, while nipping and conveying a recording material in a nip between the endless film and the pressing member, the fixing unit is configured to fix an image formed on a recording material to the recording material by heat the image of the endless film, wherein the conductive layer includes a plurality of segments arranged in a row in the longitudinal direction and electrically separated from each other, where each of the plurality of segments is formed continuously over an entire circumference of the endless film in the circumferential direction, and wherein the conductive layer is configured such that a heat generation amount in an end portion of the endless film in the longitudinal direction is less than a heat generation amount in a central portion of the endless film in the longitudinal direction in a case where the alternating magnetic field is applied to a whole area of the endless film in the longitudinal direction in a state where a temperature of the central portion of the endless film is equal to a temperature of the end portion of the endless film.

12. A fixing member comprising:

a conductive layer configured to generate heat in a case where a circulation current in a circumferential direction of the fixing member having a tubular shape is induced, wherein the conductive layer includes a plurality of segments arranged in a row in a longitudinal direction of the tubular shape and electrically separated from each other, where each of the plurality of segments is formed continuously over an entire circumference of the tubular shape in the circumferential direction, wherein a first area is an area of the fixing member in the longitudinal direction and includes a central portion, wherein a second area is the area of the fixing member in the longitudinal direction and includes an end portion, wherein all of the plurality of segments are disposed in the first area, and wherein the fixing member is an endless film having flexibility.

* * * * *